(12) United States Patent
Pan et al.

(10) Patent No.: US 7,034,984 B2
(45) Date of Patent: Apr. 25, 2006

(54) FABRICATION OF A HIGH FILL RATIO REFLECTIVE SPATIAL LIGHT MODULATOR WITH HIDDEN HINGE

(75) Inventors: Shaoher X. Pan, San Jose, CA (US); Xiao (Charles) Yang, Sunnyvale, CA (US)

(73) Assignee: Miradia Inc., Sunnyvale, CA (US)

( * ) Notice: Subject to any disclaimer, the term of this patent is extended or adjusted under 35 U.S.C. 154(b) by 20 days.

(21) Appl. No.: 10/849,404

(22) Filed: May 18, 2004

(65) Prior Publication Data

US 2004/0214350 A1    Oct. 28, 2004

Related U.S. Application Data

(63) Continuation of application No. 10/610,967, filed on Jun. 30, 2003, now abandoned, and a continuation-in-part of application No. 10/378,056, filed on Feb. 27, 2003, now abandoned, and a continuation-in-part of application No. 10/378,041, filed on Feb. 27, 2003, now abandoned, and a continuation-in-part of application No. 10/378,058, filed on Feb. 27, 2003, now abandoned.

(60) Provisional application No. 60/390,389, filed on Jun. 19, 2002, provisional application No. 60/475,404, filed on Jun. 2, 2003.

(51) Int. Cl.
*H01L 21/00* (2006.01)
*G02B 26/00* (2006.01)
(52) U.S. Cl. .......................... 359/291; 359/237; 216/2
(58) Field of Classification Search ................ 359/237, 359/291
See application file for complete search history.

(56) References Cited

U.S. PATENT DOCUMENTS 4,229,732 A   10/1980   Hartstein et al.

(Continued)

FOREIGN PATENT DOCUMENTS

EP         1237032 A2       9/2002

OTHER PUBLICATIONS

Henley, Francois J. and Current, Michael I., "A New SOI Manufacturing Technology Using Atomic Layer Cleaving," Silicon Genesis Corporation, Campbell, CA, pp. 1–5.

(Continued)

*Primary Examiner*—Scott J. Sugarman
*Assistant Examiner*—Richard Hanig
(74) *Attorney, Agent, or Firm*—Townsend and Townsend and Crew LLP

(57) ABSTRACT

Fabrication of a micro mirror array having a hidden hinge that is useful, for example, in a reflective spatial light modulator. In one embodiment, the micro mirror array is fabricated from a substrate that is a first substrate of a single crystal material. Cavities are formed in a first side of the first substrate. Separately, electrodes and addressing and control circuitry are fabricated on a first side of a second substrate. The first side of the first substrate is bonded to the first side of the second substrate. The sides are aligned so the electrodes on the second substrate are in proper relation with the mirror plates that will be formed on the first substrate and that the electrodes will control. The first substrate is thinned to a pre-determined, desired thickness, a hinge is etched, a sacrificial material is deposited, the upper surface of the first substrate is planarized, a reflective surface is deposited to cover the hinge, a mirror is released by etching and the sacrificial layer around the hinge is removed to release the hinge so the hinge can rotate about an axis in line with the hinge.

51 Claims, 24 Drawing Sheets

U.S. PATENT DOCUMENTS

| | | |
|---|---|---|
| 4,317,611 A | 3/1982 | Petersen |
| 4,566,935 A | 1/1986 | Hornbeck |
| 4,615,595 A | 10/1986 | Hornbeck |
| 5,061,049 A | 10/1991 | Hornbeck |
| 5,172,262 A | 12/1992 | Hornbeck |
| 5,311,360 A | 5/1994 | Bloom et al. |
| 5,382,961 A | 1/1995 | Gale, Jr. |
| 5,448,314 A | 9/1995 | Heimbuch et al. |
| 5,452,024 A | 9/1995 | Sampsell |
| 5,489,952 A | 2/1996 | Gove et al. |
| 5,504,614 A | 4/1996 | Webb et al. |
| 5,535,047 A | 7/1996 | Hornbeck |
| 5,583,688 A | 12/1996 | Hornbeck |
| 5,589,852 A | 12/1996 | Thompson et al. |
| 5,600,383 A | 2/1997 | Hornbeck |
| 5,661,591 A | 8/1997 | Lin et al. |
| 5,663,749 A | 9/1997 | Farris et al. |
| 5,742,419 A | 4/1998 | Dickensheets et al. |
| 5,757,536 A | 5/1998 | Ricco et al. |
| 5,835,256 A | 11/1998 | Huibers |
| 5,999,306 A | 12/1999 | Atobe et al. |
| 6,038,056 A | 3/2000 | Florence et al. |
| 6,046,840 A | 4/2000 | Huibers |
| 6,049,317 A | 4/2000 | Thompson et al. |
| 6,172,797 B1 | 1/2001 | Huibers |
| 6,201,521 B1 | 3/2001 | Doherty |
| 6,252,277 B1 | 6/2001 | Chan et al. |
| 6,323,982 B1 | 11/2001 | Hornbeck |
| 6,337,760 B1 | 1/2002 | Huibers et al. |
| 6,356,378 B1 | 3/2002 | Huibers |
| 6,388,661 B1 | 5/2002 | Richards |
| 6,396,619 B1 | 5/2002 | Huibers et al. |
| 6,429,033 B1 | 8/2002 | Gee et al. |
| 6,529,310 B1 | 3/2003 | Huibers et al. |
| 6,538,800 B1 | 3/2003 | Huibers |
| 6,542,653 B1 | 4/2003 | Wu et al. |
| 6,543,286 B1 | 4/2003 | Garverick et al. |
| 6,809,852 B1 | 10/2004 | Tao et al. |
| 6,960,305 B1 * | 11/2005 | Doan et al. .................... 216/2 |
| 2002/0041455 A1 | 4/2002 | Sawada et al. |
| 2002/0071166 A1 | 6/2002 | Jin et al. |
| 2002/0071169 A1 | 6/2002 | Bowers et al. |
| 2002/0132389 A1 | 9/2002 | Patel et al. |
| 2003/0117686 A1 | 6/2003 | DiCarlo |
| 2004/0004753 A1 | 1/2004 | Pan |
| 2004/0008402 A1 | 1/2004 | Patel et al. |
| 2004/0125347 A1 | 7/2004 | Patel et al. |
| 2004/0136044 A1 | 7/2004 | Miller et al. |
| 2004/0184133 A1 | 9/2004 | Su et al. |
| 2004/0190817 A1 | 9/2004 | Aubuchon |
| 2005/0041277 A1 | 2/2005 | Huibers |

OTHER PUBLICATIONS

Petersen, K.E., Micromechanical Light Modulator Array Fabricated On Silicon, Applied Physics Letters, Oct. 15, 1977, pp. 521-523, vol. 31, No. 8.

Petersen, K.E., Micromechanical Membrane Switches On Silicon, IBM J. Res. Develop., Jul. 1979, pp. 376-385, vol. 23, No. 4.

* cited by examiner

FABRICATION OF A HIGH FILL RATIO REFLECTIVE SPATIAL LIGHT MODULATOR WITH HIDDEN HINGE

CROSS-REFERENCE TO RELATED APPLICATION

The present application is a continuation of application Ser. No. 10/610,967, "Fabrication of a High Fill Ratio Reflective Spatial Light Modulator with Hidden Hinge," filed Jun. 30, 2003, now abandoned, which claims priority from provisional U.S. Patent Application Ser. No. 60/475,404, for "Hidden Hinge High Fill Ratio Reflective Spatial Light Modulator," filed Jun. 2, 2003, the disclosure of which is incorporated by reference. This application also is a continuation-in-part of application Ser. No. 10/378,056, for "Reflective Spatial Light Modulator," filed Feb. 27, 2003, now abandoned the disclosure of which is incorporated by reference, which claims the benefit of provisional U.S. Patent Application Ser. No. 60/390,389, for "Reflective Spatial Light Modulator," filed Jun. 19, 2002. This application also is a continuation-in-part of application Ser. No. 10/378,041, for "Fabrication of a Reflective Spatial Light Modulator," filed Feb. 27, 2003, now abandoned, the disclosure of which is incorporated by reference, which claims the benefit of provisional U.S. Patent Application Ser. No. 60/390,389, for "Reflective Spatial Light Modulator," filed Jun. 19, 2002. This application also is a continuation-in-part of pending application Ser. No. 10/378,058, for "Architecture of a Reflective Spatial Light Modulator," filed Feb. 27, 2003, the disclosure of which is incorporated by reference, which claims the benefit of provisional U.S. Patent Application Ser. No. 60/390,389, for "Reflective Spatial Light Modulator," filed Jun. 19, 2002.

BACKGROUND

1. Field of the Invention

This invention relates to spatial light modulators (SLMs), and more particularly to a micro mirror structure with hidden hinges to maximize pixel fill ratio, minimize scattering and diffraction, and achieve a high contrast ratio and high image quality.

2. Background of the Invention

Spatial light modulators (SLMs) have numerous applications in the areas of optical information processing, projection displays, video and graphics monitors, televisions, and electrophotographic printing. Reflective SLMs are devices that modulate incident light in a spatial pattern to reflect an image corresponding to an electrical or optical input. The incident light may be modulated in phase, intensity, polarization, or deflection direction. A reflective SLM is typically comprised of an area or two-dimensional array of addressable picture elements (pixels) capable of reflecting incident light. A key parameter of SLMs, especially in display applications, is the portion of the optically active area to the pixel area (also measured as the fraction of the SLM's surface area that is reflective to the total surface area of the SLM, also called the "fill ratio"). A high fill ratio is desirable.

Prior art SLMs have various drawbacks. These drawbacks include, but are not limited to: (1) a lower than optimal optically active area that reduces optical efficiency; (2) rough reflective surfaces that reduce the reflectivity of the mirrors; (3) diffraction and scattering that lowers the contrast ratio of the display; (4) use of materials that have long-term reliability problems; and (5) complex manufacturing processes that increase the expense and lower the yield of the device.

Many prior art devices include substantial non-reflective areas on their surfaces. This provides low fill ratios, and provides lower than optimum reflective efficiency. For example, U.S. Pat. No. 4,229,732 discloses MOSFET devices that are formed on the surface of a device in addition to mirrors. These MOSFET devices take up surface area, reducing the fraction of the device area that is optically active and reducing reflective efficiency. The MOSFET devices on the surface of the device also diffract incident light, which lowers the contrast ratio of the display. Further, intense light striking exposed MOSFET devices interfere with the proper operation of the devices, both by charging the MOSFET devices and overheating the circuitry.

Some SLM designs have rough surfaces that scatter incident light and reduce reflective efficiency. For example, in some SLM designs the reflective surface is an aluminum film deposited on an LPCVD silicon nitride layer. It is difficult to control the smoothness of these reflective mirror surfaces as they are deposited with thin films. Thus, the final product has rough surfaces, which reduce the reflective efficiency.

Another problem that reduces reflective efficiency with some SLM designs, particularly in some top hanging mirror designs, is large exposed hinge surface areas. These exposed hinge surface areas result in scattering and diffraction due to the hinge structure, which negatively impacts contrast ratio, among other parameters.

Many conventional SLMs, such as the SLM disclosed in U.S. Pat. No. 4,566,935, have hinges made of aluminum alloy. Aluminum, as well as other metals, is susceptible to fatigue and plastic deformation, which can lead to long-term reliability problems. Also, aluminum is susceptible to cell "memory," where the rest position begins to tilt towards its most frequently occupied position. Further, the mirrors disclosed in the U.S. Pat. No. 4,566,935 are released by removing sacrificial material underneath the mirror surface. This technique often results in breakage of the delicate micro mirror structures during release. It also requires large gaps between mirrors in order for etchants to remove the sacrificial material underneath the mirrors, which reduce the fraction of the device area that is optically active.

Other conventional SLMs require multiple layers including a separate layer for the mirrors, hinges, electrodes and/or control circuitry. Manufacturing such a multi-layer SLM requires use of multi-layer thin film stacking and etching techniques and processes. Use of these techniques and processes is expensive and produces lower yields. For example, use of these techniques often involves extensive deposition and removal of sacrificial materials underneath the surface of the mirror plates. Multi-layer thin film deposition and stacking underneath the surface of the mirror plate typically results in rougher mirror surfaces, thereby reducing the reflective efficiency of the mirrors. Moreover, having the mirror and the hinge in a different layer or substrate results in translational displacement upon deflection of the mirror. With translational displacements, the mirrors in an array must be spaced to avoid mechanical interference among adjacent mirrors. Because the mirrors in the array cannot be located too closely to the other mirrors in the array, the SLM suffers from a lower than optimal optically active area or lower fill ratio.

What is desired is an SLM with improved reflective efficiency, SLM device long-term reliability, and simplified manufacturing processes.

SUMMARY OF THE INVENTION

The present invention is a spatial light modulator (SLM). In one embodiment, the SLM has a reflective selectively deflectable micro mirror array fabricated from a first substrate bonded to a second substrate having individually addressable electrodes. The second substrate may also have addressing and control circuitry for the micro mirror array. Alternatively, portions of the addressing and control circuitry are on a separate substrate and connected to the circuitry and electrodes on the second substrate.

The micro mirror array includes a controllably deflectable mirror plate with a highly reflective surface to reflect incident light. The mirror plate is connected to a hinge by a connector. The hinge is in turn connected to a spacer support frame with spacer support walls. The hinge is substantially concealed under the reflective surface. By hiding the hinge substantially under the reflective surface, the amount of scattering and diffraction due to light hitting and reflecting off of an exposed hinge structure is eliminated, thereby maximizing the contrast ratio of the device.

The mirror plate, the connector, the hinge, the spacer support frame, and the spacer support walls are fabricated from a first substrate. This first substrate is a wafer of a single material, single crystal silicon in one embodiment. The spacer support walls provide separation between the mirror plate and an electrode associated with that mirror plate that controls the deflection of the mirror plate. The electrode is located on the second substrate and the second substrate is bonded to the micro mirror array.

Because the hinge and the mirror plate are in the same substrate (i.e., in the same layer), there is no translational movement or displacement as the mirror rotates about the longitudinal axis of the hinge. With no translational displacement, the gap between the mirrors and the support walls are limited only by the fabrication technology and process. The close spacing of the mirror plates and the hiding of by positioning the hinge substantially beneath the reflective surface allow for a high fill ratio for the micro mirror array, improved contrast ratio, minimized scattering and diffraction of light, and virtual elimination of light passing through the micro mirror array to strike the circuitry on the second substrate.

Further, because the mirror plate and the hinge are fabricated from a single crystal silicon material in a preferred embodiment, the resulting hinge is stronger and more reliable and suffers from virtually no memory effect, fractures along grain boundaries or fatigue. A single crystal silicon substrate has significantly fewer micro defects and cracks than other materials, especially deposited thin films. As a result, it is less likely to fracture (or to propagate micro fractures) along grain boundaries in a device. Also, use of a single substrate as in the present invention minimizes the use of multi-layer thin film stacking and etching processes and techniques. In the present invention, sacrificial material deposition and removal is confined to a localized area, i.e., around the hinge. Moreover, sacrificial material need not be removed from under the mirrors in the present invention. Therefore, removal of the sacrificial material is much easier and the upper surface of the mirror plate remains smooth permitting the reflective surface to be added to an ultra smooth surface.

The SLM is fabricated with few steps, which keeps the fabrication cost and complexity low. Cavities are formed in a first side of the first substrate. In parallel, the electrodes and addressing and control circuitry are fabricated on a first side of the second substrate. The first side of the first substrate is bonded to the first side of the second substrate. The sides are aligned so the electrodes on the second substrate are in proper relation with the mirror plates that the electrodes will control. The first substrate is thinned to a pre-determined, desired thickness, a hinge is etched, a sacrificial material is deposited in an area around the hinge, a surface is planarized, a reflective surface is deposited to cover the hinge, a mirror plate is released by etching, and the sacrificial layer around the hinge is removed.

The net result is an easily manufacturable SLM that can achieve high optical efficiency and performance to produce high quality images reliably and cost-effectively.

BRIEF DESCRIPTION OF THE DRAWINGS

FIG. 2a is a perspective view of a single micro mirror in one embodiment of the invention.

FIG. 2b is a perspective view of a corner of the micro mirror of FIG. 2a.

FIG. 4a is a perspective view showing the bottom and sides of a single micro mirror in one embodiment of the invention.

FIG. 4b is a perspective view of a corner of the micro mirror of FIG. 4a.

FIG. 8 is a cross sectional view of the deflected micro mirror shown in FIG. 2a.

FIG. 12b is a perspective view of a corner of the micro mirror of FIG. 12a.

FIG. 13 is a perspective view showing the bottom and sides of the micro mirror in the embodiment shown in FIG. 12a.

DETAILED DESCRIPTION OF THE PREFERRED EMBODIMENTS

The reflective spatial light modulator ("SLM") 100 has an array 103 of deflectable mirrors 202. Individual mirrors 202 can be selectively deflected by applying a voltage bias between that mirror 202 and a corresponding electrode 126. The deflection of each mirror 202 controls light reflected from a light source to a video display. Thus, controlling the deflection of a mirror 202 allows light striking that mirror 202 to be reflected in a selected direction, and thereby allows control of the appearance of a pixel in the video display.

Figure 1:
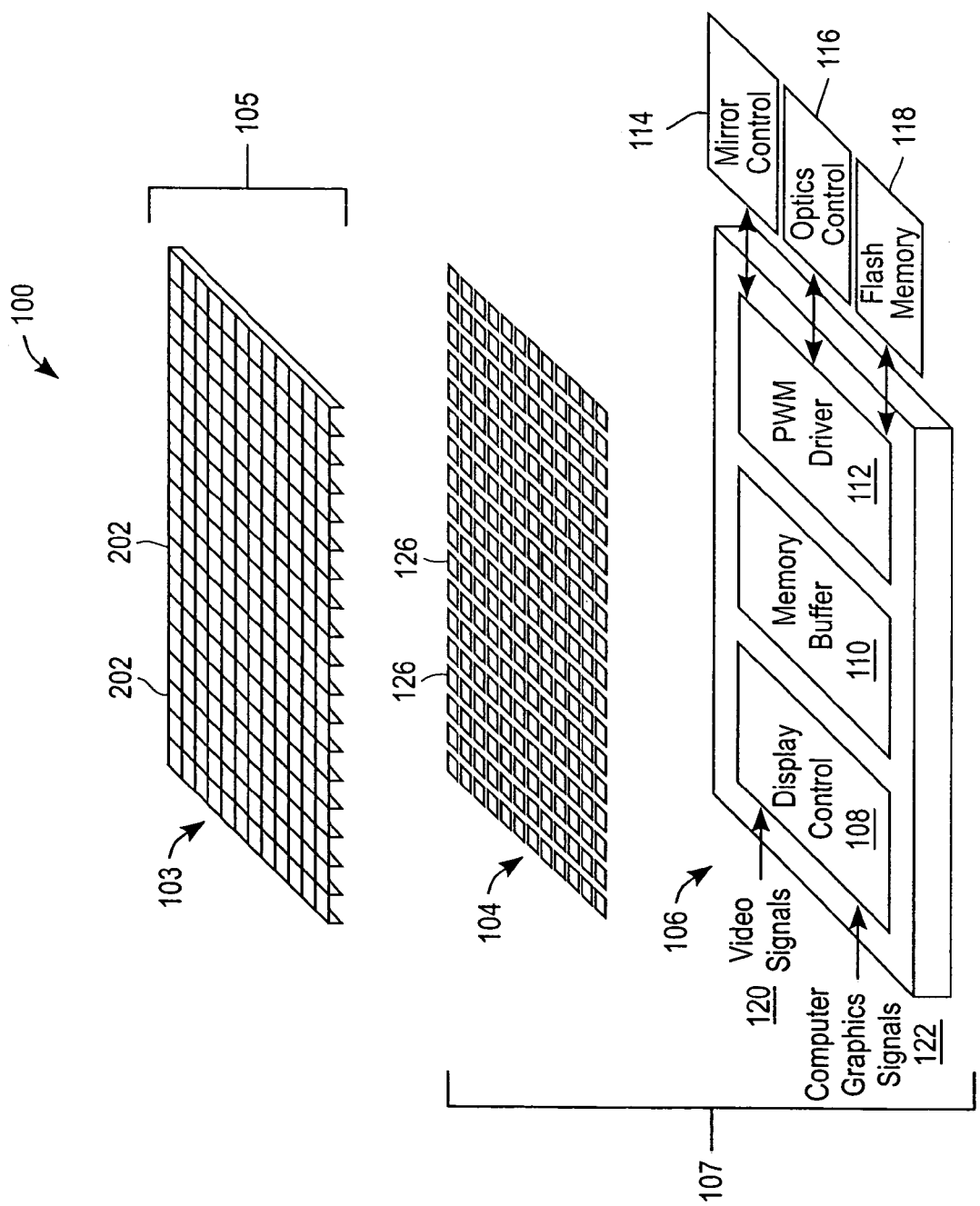
FIG. 1 is a schematic diagram that illustrates the general architecture of a spatial light modulator according to one embodiment of the invention.

Spatial Light Modulator Overview:

FIG. 1 is a schematic diagram that illustrates the general architecture of an SLM 100 according to one embodiment of the invention. The illustrated embodiment has three layers. The first layer is a mirror array 103 that has a plurality of deflectable micro mirrors 202. In one preferred embodiment, the micro mirror array 103 is fabricated from a first substrate 105 that, upon completion of fabrication, is a single material, such as single crystal silicon in the SLM 160.

The second layer is an electrode array 104 with a plurality of electrodes 126 for controlling the micro mirrors 202. Each electrode 126 is associated with a micro mirror 202 and controls the deflection of that micro mirror 202. Addressing circuitry allows selection of a single electrode 126 for control of the particular micro mirror 202 associated with that electrode 126.

The third layer is a layer of control circuitry 106. This control circuitry 106 has addressing circuitry, which allows the control circuitry 106 to control a voltage applied to selected electrodes 126. This allows the control circuitry 106 to control the deflections of the mirrors 202 in the mirror array 103 via the electrodes 126. Typically, the control circuitry 106 also includes a display control 108, line memory buffers 110, a pulse width modulation array 112, and inputs for video signals 120 and graphics signals 122. A micro controller 114, optics control circuitry 116, and a flash memory 118 may be external components connected to the control circuitry 106, or may be included in the control circuitry 106 in some embodiments. In various embodiments, some of the above listed parts of the control circuitry 106 may be absent, may be on a separate substrate and connected to the control circuitry 106, or other additional components may be present as part of the control circuitry 106 or connected to the control circuitry 106.

In one embodiment, both the second layer 104 and the third layer 106 are fabricated using semiconductor fabrication technology on a single second substrate 107. That is, the second layer 104 is not necessarily separate and above the third layer 106. Rather, the term "layer" is an aid for conceptualizing different parts of the spatial light modulator 100. For example, in one embodiment, both the second layer 104 of electrodes 126 is fabricated on top of the third layer of control circuitry 106, both fabricated on a single second substrate 107. That is, the electrodes 126, as well as the display control 108, line memory buffers 110, and the pulse width modulation array 112 are all fabricated on a single substrate in one embodiment. Integration of several functional components of the control circuitry 106 on the same substrate provides an advantage of improved data transfer rate over conventional spatial light modulators, which have the display control 108, line memory buffers 110, and the pulse width modulation array 112 fabricated on a separate substrate. Further, fabricating the second layer of the electrode array 104 and the third layer of the control circuitry 106 on a single substrate 107 provides the advantage of simple and cheap fabrication, and a compact final product.

After the layers 103 and 107 are fabricated, they are bonded together to form the SLM 100. The first layer with the mirror array 103 covers the second and third layers 104 and 106, collectively 107. The area under the mirrors 202 in the mirror array 103 determines how much room there is beneath the first layer 103 for the electrodes 126, and addressing and control circuitry 106. There is limited room beneath the micro mirrors 202 in the mirror array 103 to fit the electrodes 126 and the electronic components that form the display control 108, line memory buffers 110, and the pulse width modulation array 112. The present invention uses fabrication techniques that allow the creation of small feature sizes, such as processes that allow fabrication of features of 0.18 microns, and processes that allow the fabrication of features of 0.13 microns or smaller. Conventional spatial light modulators are made through fabrication processes that do not allow such small features. Typically, conventional spatial light modulators are made through fabrication processes that limit feature size to approximately 1 micron or larger. Thus, the present invention allows the fabrication of many more circuit devices, such as transistors, in the limited area beneath the micro mirrors of the mirror array 103. This allows integration of items such as the display control 108, line memory buffers 110, and the pulse width modulation array 112 on the same substrate as the electrodes 126. Including such control circuitry 106 on the same substrate 107 as the electrodes 126 improves the performance of the SLM 100. This allows integration of many more items, such as display control 108, line memory buffers 110 and pulse width modulation array 112 on the same substrate as the electrodes 126, in the limited area beneath the micro mirrors in the micro mirror array 103. Including such control circuitry 106 on the same substrate 107 as the electrodes 126 improves the performance of the SLM 100. In other embodiments, various combinations of the electrodes 126 and components of the control circuitry may be fabricated on different substrates and electrically connected.

In other embodiments, various combinations of the electrodes 126 and components of the control circuitry may be fabricated on different substrates and electrically connected.

Figure 2:
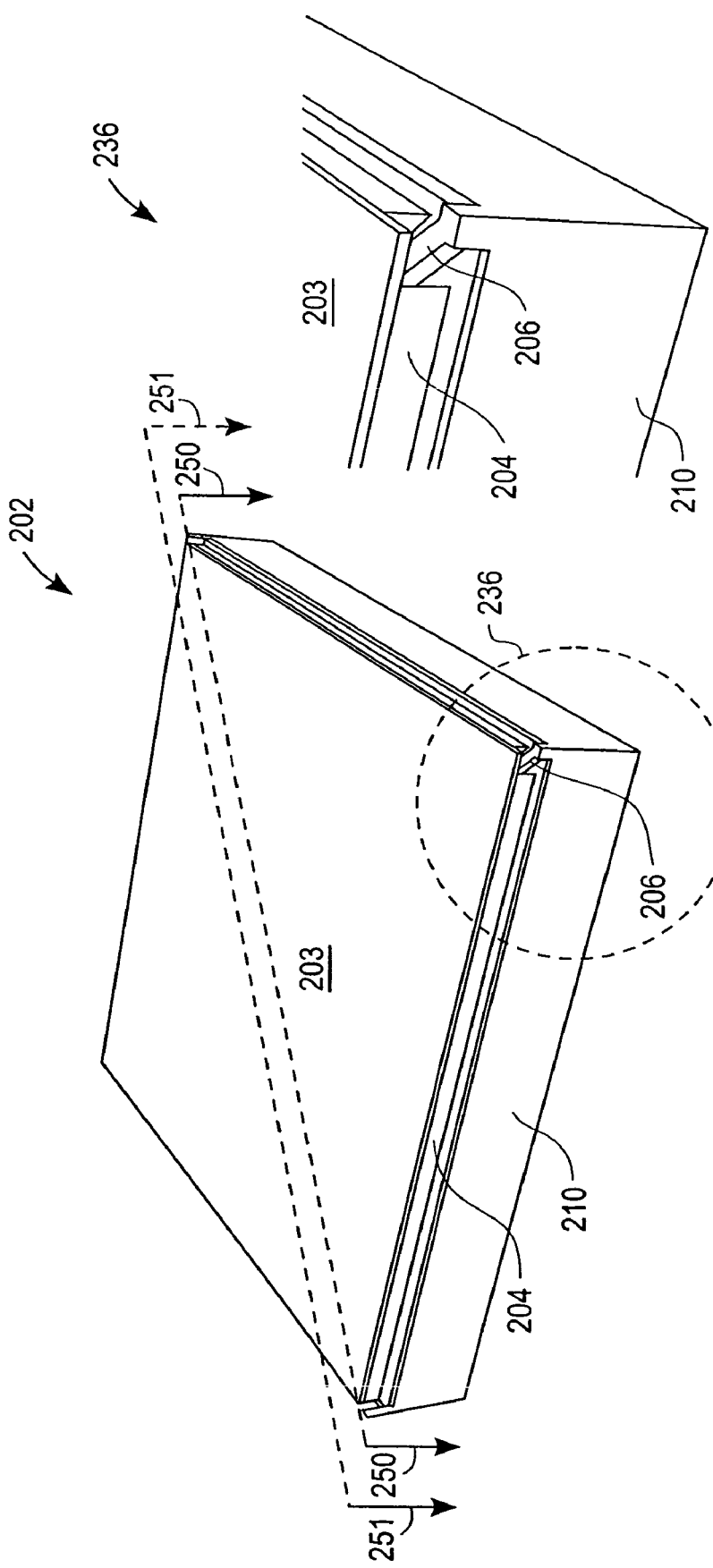

The Mirror:

FIG. 2a is a perspective view of one embodiment of a single micro mirror 202, and FIG. 2b is a more detailed perspective view of a corner 236 of the micro mirror 202 shown in FIG. 2a. In one preferred embodiment, the micro mirror 202 includes at least one mirror plate 204, a hinge 206, a connector 216 and a reflective surface 203. In an alternate embodiment, the micro mirror 202 further includes a spacer support frame 210 for supporting the mirror plate 204, hinge 206, reflective surface 203 and connector 216. Preferably, the mirror plate 204, hinge 206, connector 216 and spacer support frame 210 are fabricated from a wafer of a single material, such as single crystal silicon. Thus, the first substrate 105 shown in FIG. 1 in such an embodiment is a wafer of single crystal silicon. Fabricating the micro mirror 202 out of a single material wafer greatly simplifies the fabrication of the mirror 202. Further, single crystal silicon can be polished to create smooth mirror surfaces that have an order of magnitude smoother surface roughness than those of deposited films. Mirrors 202 fabricated from single crystal silicon are mechanically rigid, which prevents undesired bending or warping of the mirror surface, and hinges fabricated from single crystal silicon are stronger, more reliable and suffer from virtually no memory effect, fractures along grain boundaries or fatigue, all of which are common with hinges made of from many other materials used in micro mirror arrays. In other embodiments, other materials may be used instead of single crystal silicon. One possibility is the use of another type of silicon (e.g. polysilicon, or amorphous silicon) for the micro mirror 202, or even making the mirror 202 completely out of a metal (e.g. an aluminum alloy, or tungsten alloy). Also, use of a single substrate as in the present invention avoids the use of multi-layer thin film stacking and etching processes and techniques.

Figure 3:
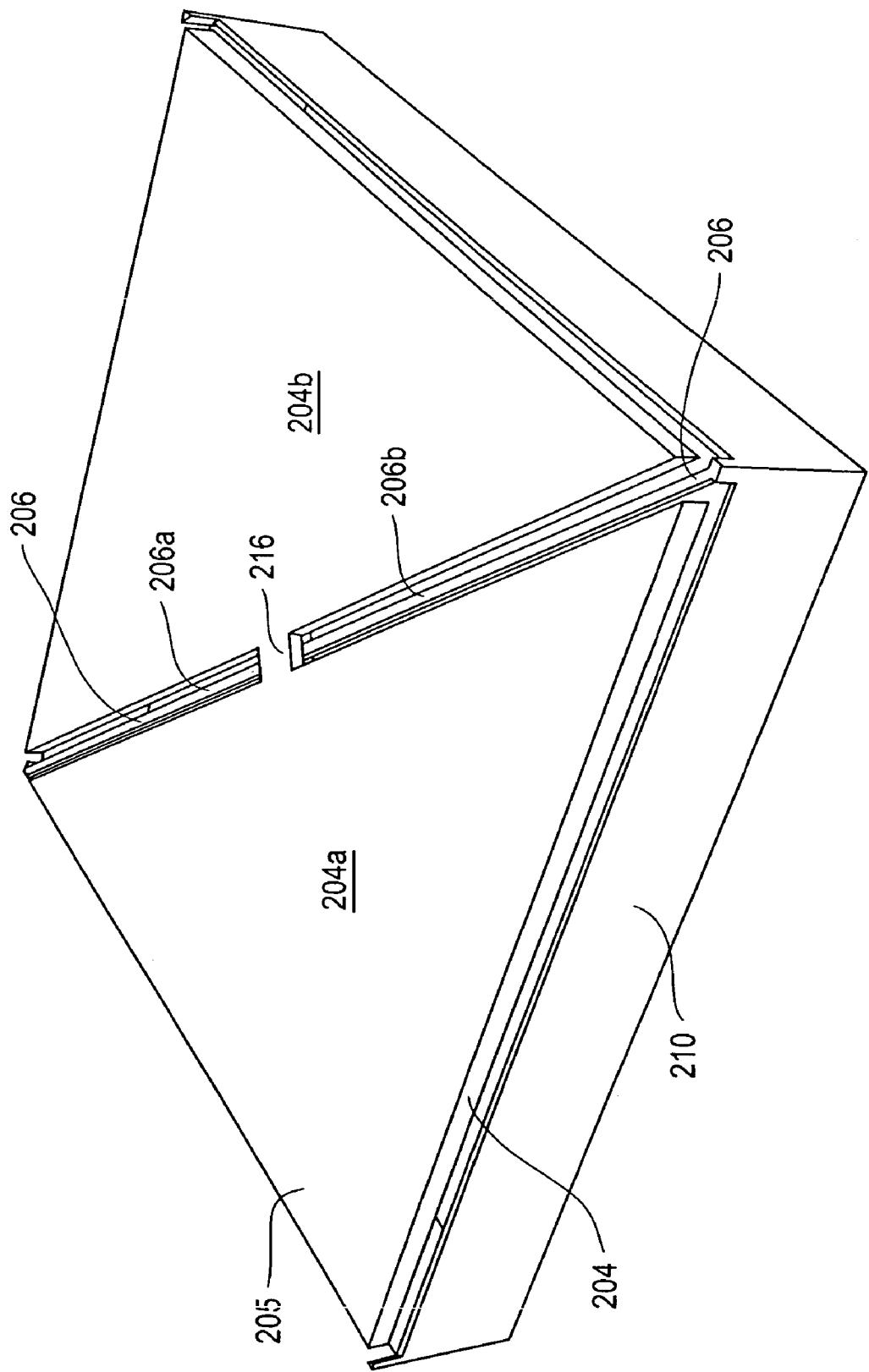
FIG. 3 is a perspective view of a single micro mirror without the reflective surface showing the top and sides of a mirror plate of a micro mirror array in one embodiment.
Figure 7A:
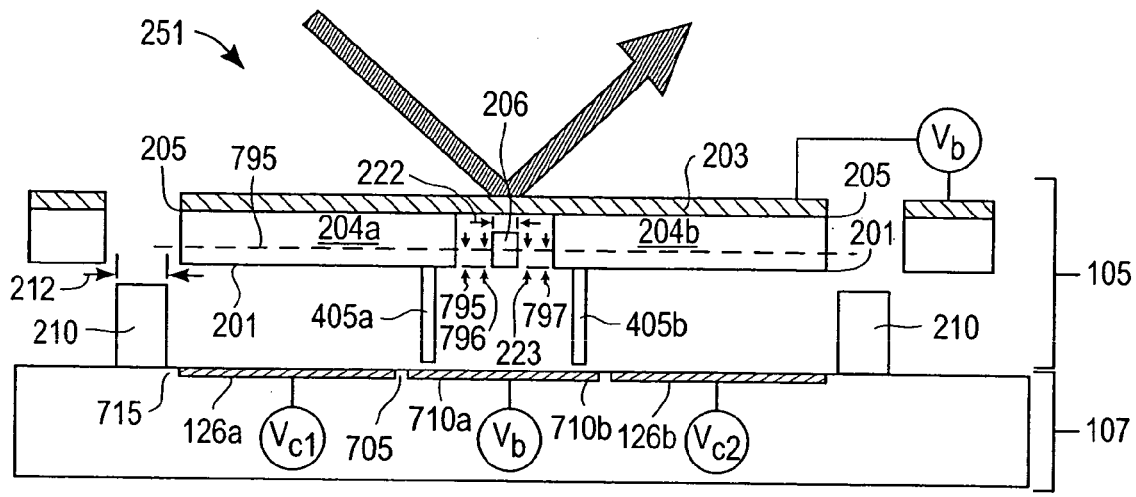
FIG. 7a is a cross sectional view of the undeflected micro mirror shown in FIG. 2a along an offset diagonal cross section.
Figure 7B:
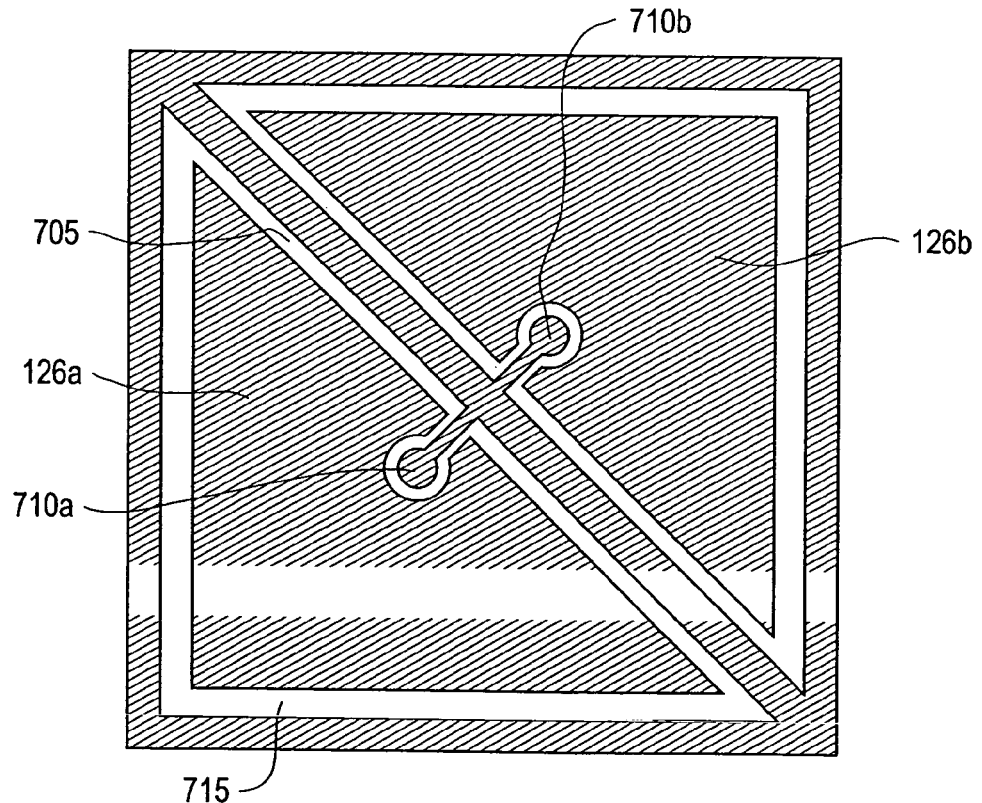
FIG. 7b is a top view of the electrodes and landing tips beneath a mirror plate formed in the second substrate in one embodiment of the invention.

As shown in FIGS. 2a–b, 3, 4a–b, 7a and 8 and as described above, the micro mirror 202 has a mirror plate 204. This mirror plate 204 is the portion of the micro mirror 202 that is coupled to the hinge 206 by a connector 216 and selectively deflected by applying a voltage bias between the mirror 202 and a corresponding electrode 126. The mirror plate 204 in the embodiment shown in FIG. 3 includes triangular portions 204a and 204b. In the embodiment shown in FIGS. 12a, 12b and 13, the mirror plate 204 is substantially square in shape, and approximately fifteen microns by fifteen microns, for an approximate area of 225 square microns, although other shapes and sizes are also possible. The mirror plate 204 has an upper surface 205 and a lower surface 201. The upper surface 205 is preferably a highly smooth surface, with a measure of roughness of less than 2 angstroms root mean square and preferably constituting a large proportion of the surface area of the micro mirror 204. On the upper surface 205 of the mirror plate 204 and above a portion of the hinge 206 is deposited a reflective surface 203, such as aluminum or any other highly reflective material. Preferably this reflective surface 203 has a thickness of 300A or less. The thinness of the reflective surface or material 203 ensures that it inherits the flat, smooth surface of the upper surface 205 of the mirror plate 204. This reflective surface 203 has an area greater than the area of the upper surface 205 of the mirror plate 204, and reflects light from a light source at an angle determined by the deflection of the mirror plate 204. Note that a torsion spring hinge 206 is formed substantially beneath the upper surface 205 of the mirror plate 204 and is substantially concealed by the reflective surface 203 that is deposited on the upper surface 205 and above a portion of the hinge 206. The difference between FIGS. 2a and 3 is that FIG. 2a illustrates a mirror plate 204 with the reflective surface 203 added on the upper surface 205 and substantially concealing the hinge 206, whereas FIG. 3 illustrates the mirror plate 204 without a reflective surface 203 and, therefore, revealing the hinge 206. Because the hinge 206 and the mirror plate 204 are in the same substrate 105 and, as illustrated in FIGS. 7a and 7b, the center height 796 of the hinge 206 is substantially coplanar 795 with the center height 795 or 797 of the mirror plate 204, there is no translational movement or displacement as the mirror 202 rotates about the longitudinal axis of the hinge 206. With no translational displacement, the gap between the mirror plate 204 and the support spacer walls of the spacer support frame 210 need only be limited by the limitations of the fabrication technology and process, typically less than 0.1 micron. The close spacing of the mirror plate 204 and the hiding of the hinge 206 substantially beneath the reflective surface 203 allow for a high fill ratio for the micro mirror array 103, improved contrast ratio, minimized scattering and diffraction of light, and virtual elimination of light passing through the micro mirror array 103 to strike the circuitry on the second substrate 107.

Figure 8:
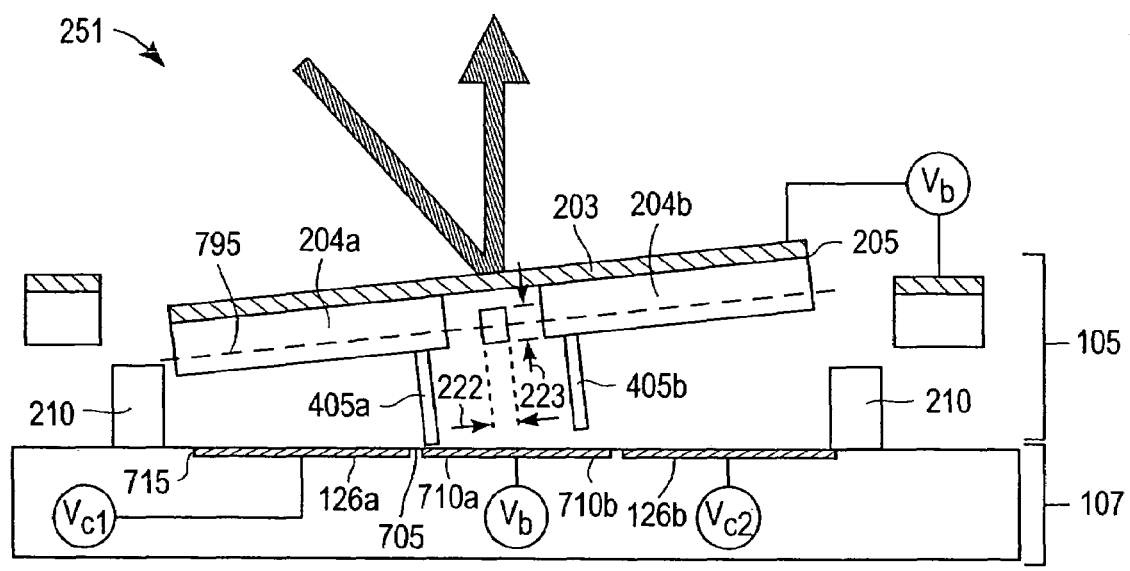
Figure 12A:
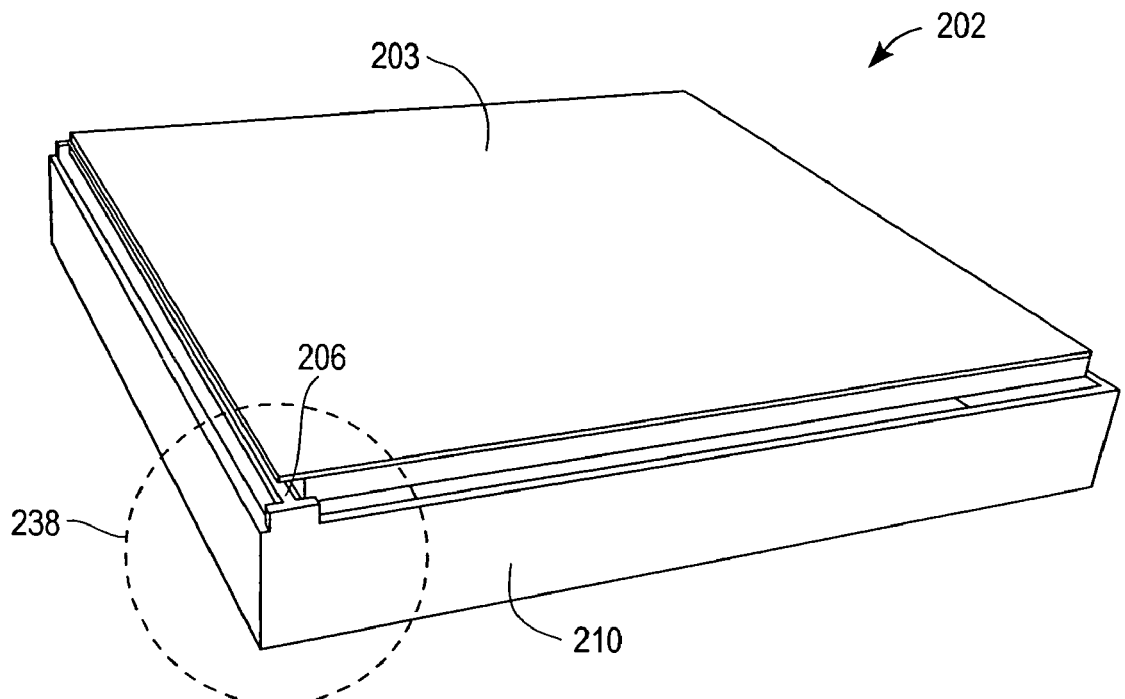
FIG. 12a is a perspective view of a micro mirror in an alternative embodiment of the invention.
Figure 12B:
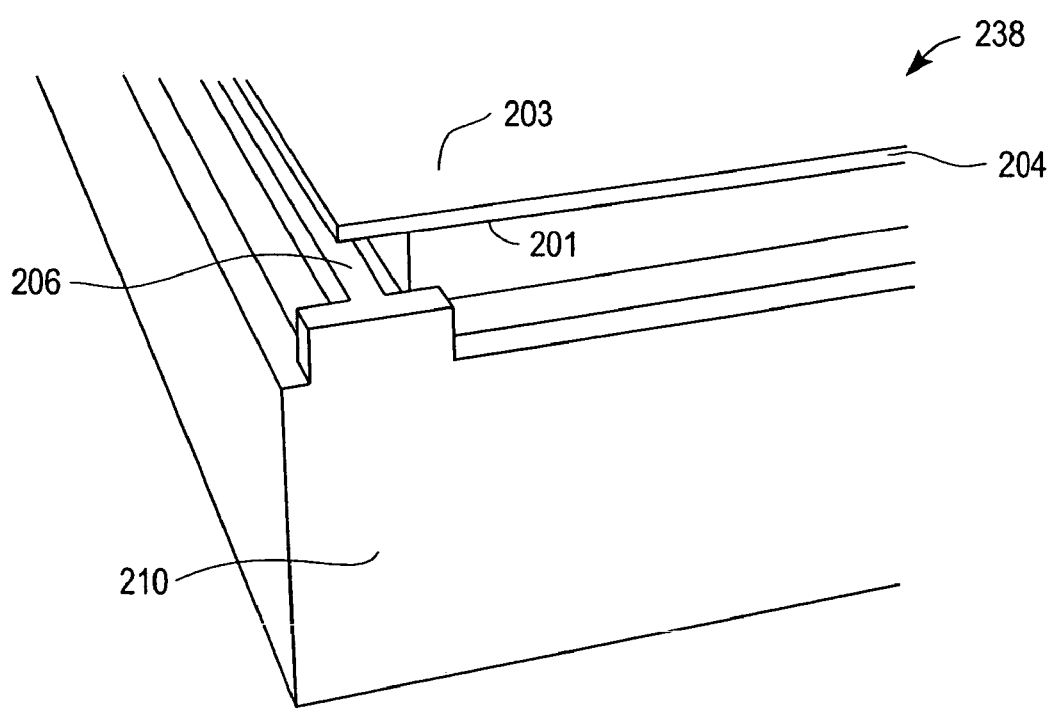
Figure 13:
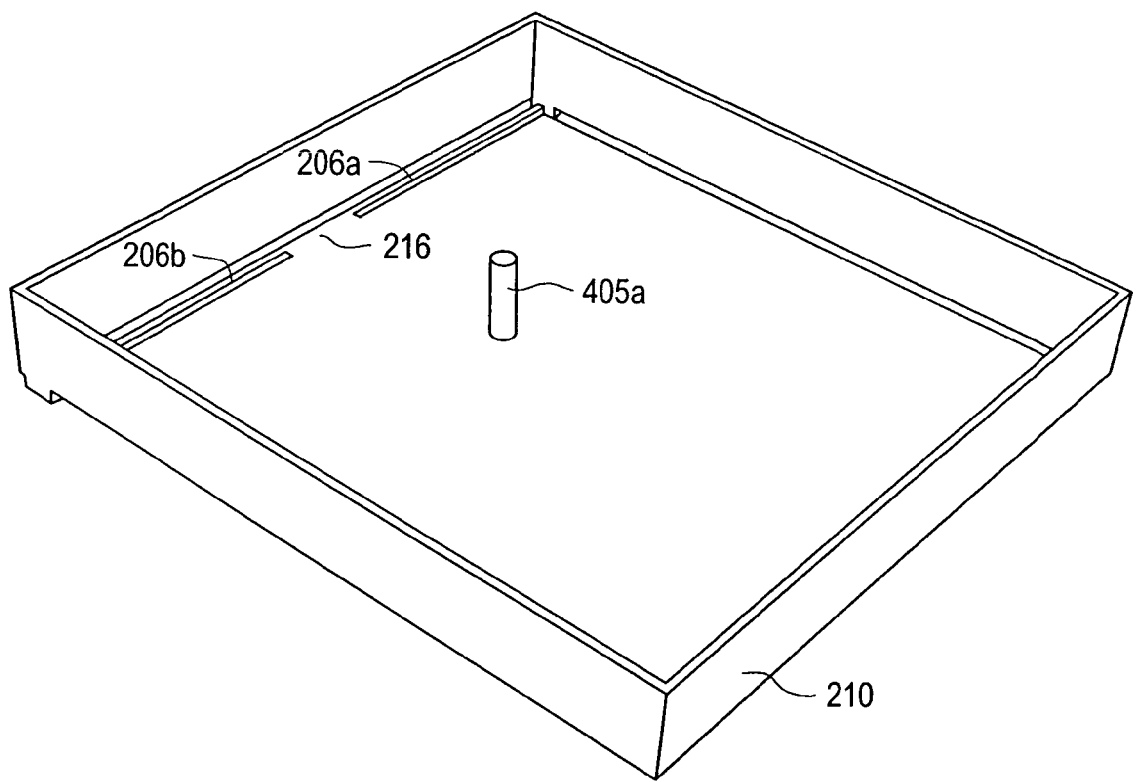

As illustrated in FIGS. 2a–b, 3, 4a–b, 7a, 8, 12a, 12b and 13, the mirror plate 204 is connected to a torsion spring hinge 206 by a connector 216. The torsion spring hinge 206 is connected to a spacer support frame 210, which holds the torsion spring hinge 206, the connector 216 and the mirror plates 204 in place. The hinge 206 includes a first arm 206a and a second arm 206b. Each arm, 206a and 206b, has two ends, one end connected to the spacer support frame 210 and the other end connected to the connector 216 as shown in FIGS. 3 and 13. Other springs, hinges and connection schemes among the mirror plate 204, the hinge 206, and spacer support frame 210 could also be used in alternative embodiments. As most clearly illustrated in FIGS. 3 and 4a, the torsion hinge 206 is preferably diagonally oriented (e.g., at a 45 degree angle) with respect to the spacer support wall 210, and divides the mirror plate 204 into two parts, or sides: a first side 204a and a second side 204b. As shown in FIG. 7b, two electrodes 126 are associated with the mirror 202, one electrode 126a for a first side 204a and one electrode 126b for a second side 204b. This allows either side 204a or 204b to be attracted to one of the electrodes 126a or 126b beneath and pivot downward and provides wide range of angular motion. The torsion spring hinge 206 allows the mirror plate 204 to rotate relative to the spacer support frame 210 about a longitudinal axis of the hinge 206 when a force such as an electrostatic force is applied to the mirror plate 204 by applying a voltage between the mirror 202 and the corresponding electrode 126. This rotation produces the angular deflection for reflecting light in a selected direction. Since the hinge 206 and the mirror plate 204 are in the same substrate 105 and, as illustrated in FIGS. 7a and 7b, the center height 796 of the hinge 206 is substantially coplanar 795 with the center height 795 or 797 of the mirror plate 204, the mirror 202 moves about the hinge 206 in pure rotation with no translational displacement. In one embodiment, as illustrated in FIGS. 7a and 8, the torsion spring hinge 206 has a width 222 that is smaller than the depth 223 of the hinge 206 (perpendicular to the upper surface 205 of the mirror plate 204). The width 222 of the hinge 206 is preferably between about 0.12 microns to about 0.2 microns, and the depth 223 is preferably between about 0.2 microns and about 0.3 microns.

As shown in FIGS. 2a–b, 3, 4a–b, 6 and 7a, the spacer support frame 210 positions the mirror plate 204 at a pre-determined distance above the electrodes 126 and addressing circuitry so that the mirror plate 204 may deflect downward to a predetermined angle. The spacer support frame 210 includes spacer support walls that are preferably formed from the same first substrate 105 and preferably positioned orthogonally as illustrated in FIGS. 2a, 4a, 12a and 13. These walls help define the height of the spacer support frame 210. The height of the spacer support frame 210 is chosen based on the desired separation between the mirror plates 204 and the electrodes 126, and the topographic design of the electrodes. A larger height allows more deflection of the mirror plate 204, and a higher maximum deflection angle. A larger deflection angle generally provides a higher contrast ratio. In one embodiment, the deflection angle of the mirror plate 204 is 12 degrees. In a preferred embodiment, the mirror plate 204 can rotate as much as 90 degrees if provided sufficient spacing and drive voltage. The spacer support frame 210 also provides support for the hinge 206 and spaces the mirror plate 204 from other mirror plates 204 in the mirror array 103. The spacer support frame 210 has a spacer wall width 212, which, when added to a gap between the mirror plate 204 and the support frame 210, is substantially equal to the distance between adjacent mirror plates 204 of adjacent micro mirrors 202. In one embodiment, the spacer wall width 212 is 1 micron or less. In one preferred embodiment, the spacer wall width 212 is 0.5 microns or less. This places the mirror plates 204 closely together to increase the fill ratio of the mirror array 103.

In some embodiments, the micro mirror 202 includes elements 405a or 405b that stop the deflection of the mirror plate 204 when the plate 204 has deflected downward to a predetermined angle. Typically, these elements may include a motion stop 405a or 405b and landing tip 710a or 710b. As shown in FIGS. 4a, 6, 7a, 7b, 8, 13 and 15, when the mirror surface 204 deflects, the motion stop 405a or 405b on the mirror plate 204 contacts the landing tip 710 (either 710a or 710b). When this occurs, the mirror plate 204 can deflect no further. There are several possible configurations for the motion stop 405a or 405b and the landing tip 710a or 710b. In the embodiments illustrated in FIGS. 4a, 6, 7a, 8, 13 and 15, the motion stop is a cylindrical column or mechanical stop 405a or 405b attached to the lower surface 201 of the mirror plate 204, and a landing tip 710 is a corresponding circular area on the second substrate 107. In the embodiment shown in FIGS. 7a, 7b and 8, landing tips 710a and 710b are electrically connected to the spacer support frame 210, and hence has zero voltage potential difference relative to the motion stop 405a or 405b to prevent sticking or welding of the motion stop 405a or 405b to the landing tip 710a or 710b, respectively. Thus, when the mirror plate 204 is rotated relative to the spacer support frame 210 beyond a predetermined angle (as determined by the length and location of the mechanical stop 405a or 405b), the mechanical motion stop 405a or 405b will come into physical contact with the landing tip 710a or 710b, respectively, and prevent any further rotation of the mirror plate 204.

In a preferred embodiment, a motion stop 405a or 405b is fabricated from the first substrate 105 and from the same material as the mirror plate 204, hinge 206, connector 216 and spacer support frame 210. The landing tip 710a or 710b is also preferably made of the same material as the motion stop 405a or 405b, mirror plate 204, hinge 206, connector 216 and spacer support frame 210. In embodiments where the material is single crystal silicon, the motion stop 405a or 405b and landing tip 710a or 710b are therefore made out of a hard material that has a long functional lifetime, which allows the mirror array 103 to last a long time. Further, because single crystal silicon is a hard material, the motion stop 405a or 405b and landing tip 710a or 710b can be fabricated with a small area where the motion stop 450a or 405b contacts the landing tip 710a or 710b, respectively, which greatly reduces sticking forces and allows the mirror plate 204 to deflect freely. Also, this means that the motion stop 405a or 405b and landing tip 710a or 710b remain at the same electrical potential, which prevents sticking that would occur via welding and charge injection processes were the motion stop 405a or 405b and landing tip 710a or 710b at different electrical potentials. The present invention is not limited to the elements or techniques for stopping the deflection of the mirror plate 204 described above. Any elements and techniques known in the art may be used.

Figure 4:
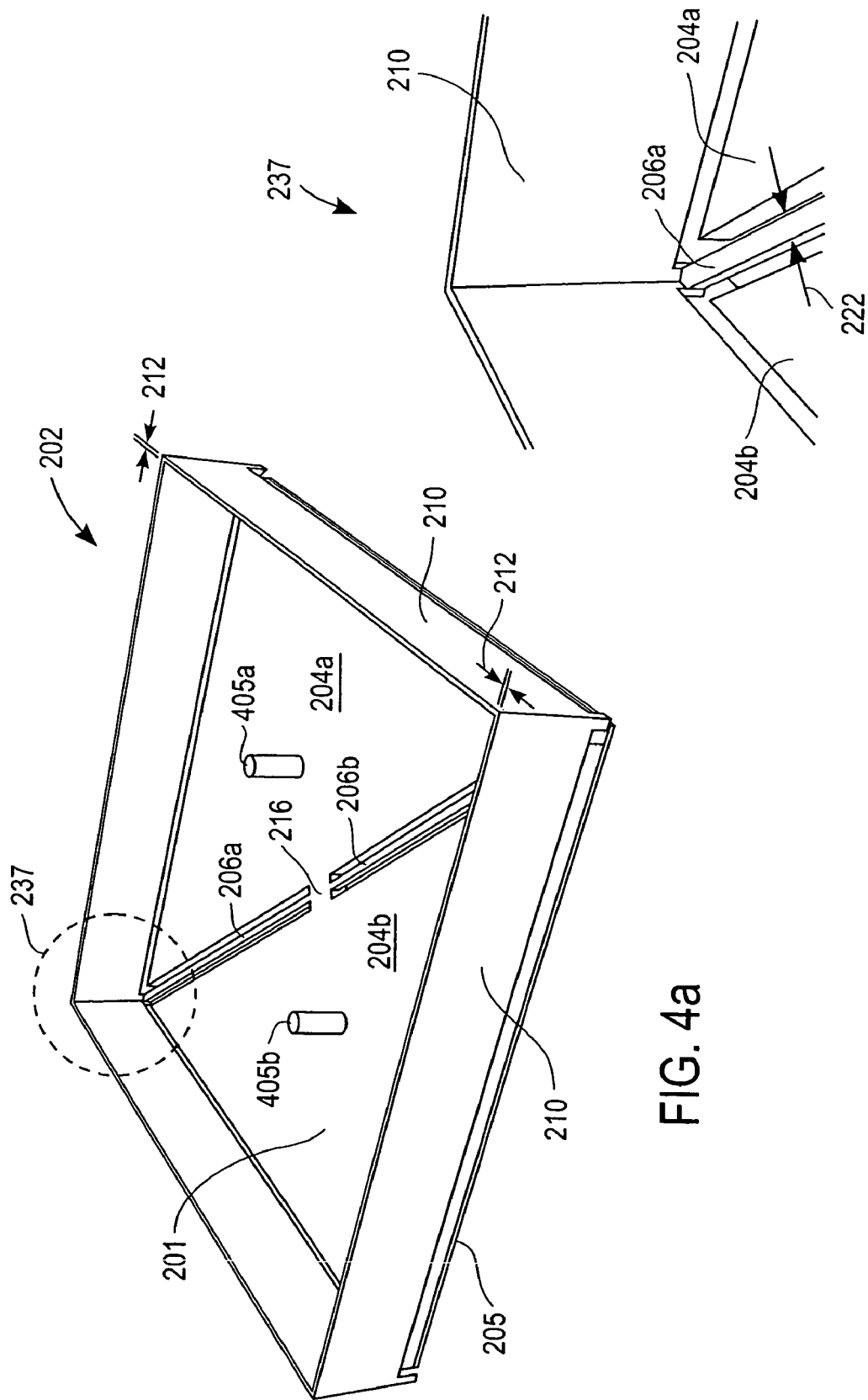

FIG. 4a is a perspective view illustrating the underside of a single micro mirror 202, including the support walls 210, the mirror plate 204 (including sides 204a and 204b and having an upper surface 205 and a lower surface 201), the hinge 206, the connector 216 and mechanical stops 405a and 405b. FIG. 4b is a more detailed perspective view of a corner 237 of the micro mirror 202 shown in FIG. 4a.

Figure 5:
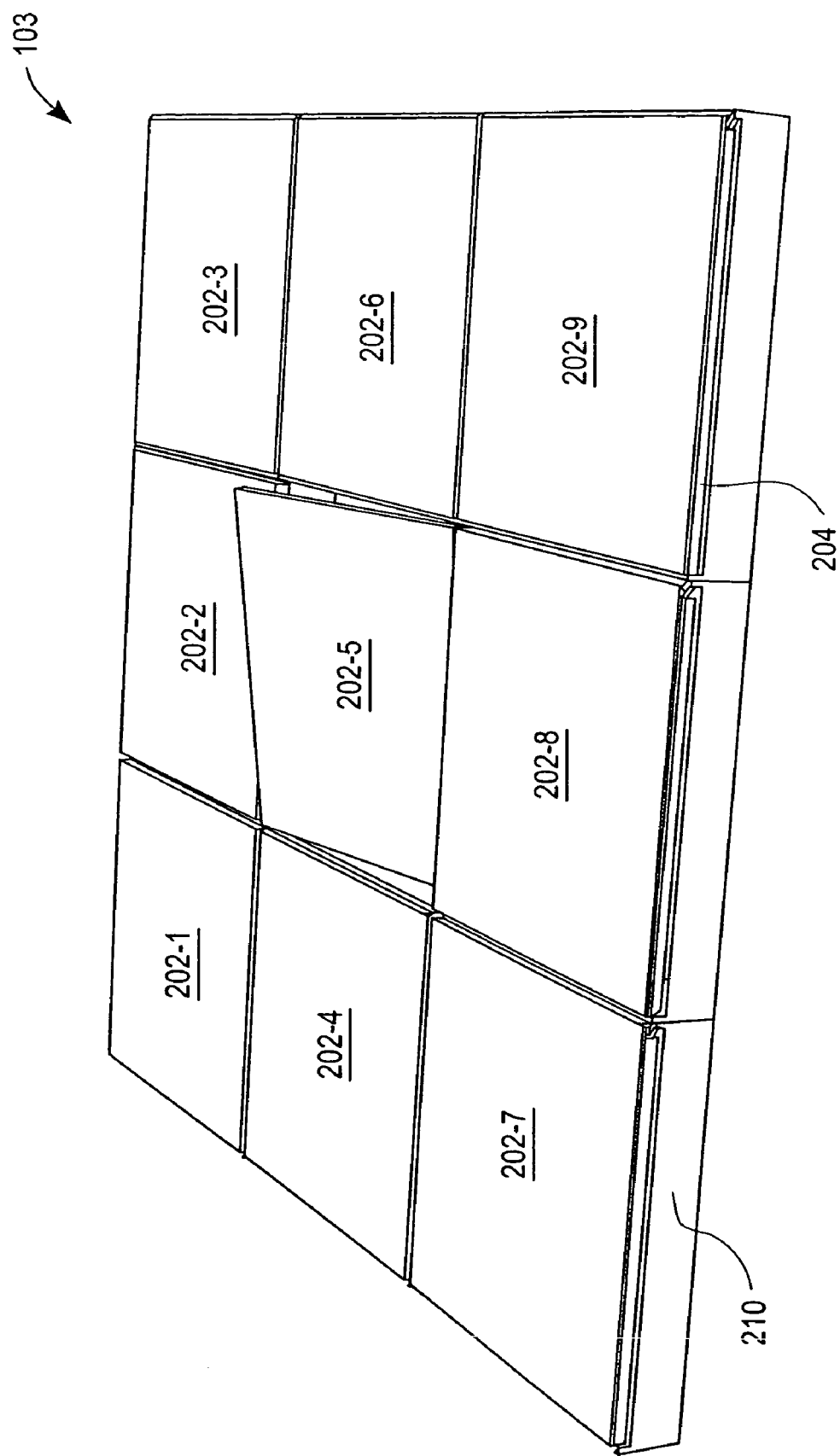
FIG. 5 is a perspective view showing the top and sides of a micro mirror array in one embodiment of the invention.

FIG. 5 is a perspective view showing the top and sides of a micro mirror array 103 having nine micro mirrors 202-1 through 202-9. While FIG. 5 shows the micro mirror array 103 with three rows and three columns, for a total of nine micro mirrors 202, micro mirror arrays 103 of other sizes are also possible. Typically, each micro mirror 202 corresponds to a pixel on a video display. Thus, larger arrays 103 with more micro mirrors 202 provide a video display with more pixels.

As shown in FIG. 5, the surface of the micro mirror array 103 has a large fill ratio. That is, most of the surface of the micro mirror array 103 is made up of the reflective surfaces 203 of the micro mirrors 202. Very little of the surface of the micro mirror array 103 is non-reflective. As illustrated in FIG. 5, the non-reflective portions of the micro mirror array 103 surface are the areas between the reflective surfaces 203 of the micro mirrors 202. For example, the width of the area between mirror 202-1 and 202-2 is determined by the spacer support wall width 212 and the sum of the width of the gaps between the mirror plates 204 of mirrors 202-1 and 202-2 and the spacer support wall 210. Note that, while the single mirror 202 as shown in FIGS. 2a, 2b, 3, 4a and 4b has been described as having its own spacer support frame 210, there are not typically two separate abutting spacer walls 210 between mirrors such as mirrors 202-1 and 202-2. Rather, there is typically one physical spacer wall of the support frame 210 between mirrors 202-1 and 202-2. Since there is no translational displacement upon deflection of the mirror plates 204, the gaps and the spacer wall width 212 can be made as small as the feature size supported by the fabrication technique. Thus, in one embodiment, the gaps are 0.2 micron, and in another embodiment the gaps are 0.13 micron or less. As semiconductor fabrication techniques allow smaller features, the size of the spacer wall 210 and the gaps can decrease to allow higher fill ratios. Embodiments of the present invention allow high fill ratios. In a preferred embodiment, the fill ratio is 96% or even higher.

Figure 6:
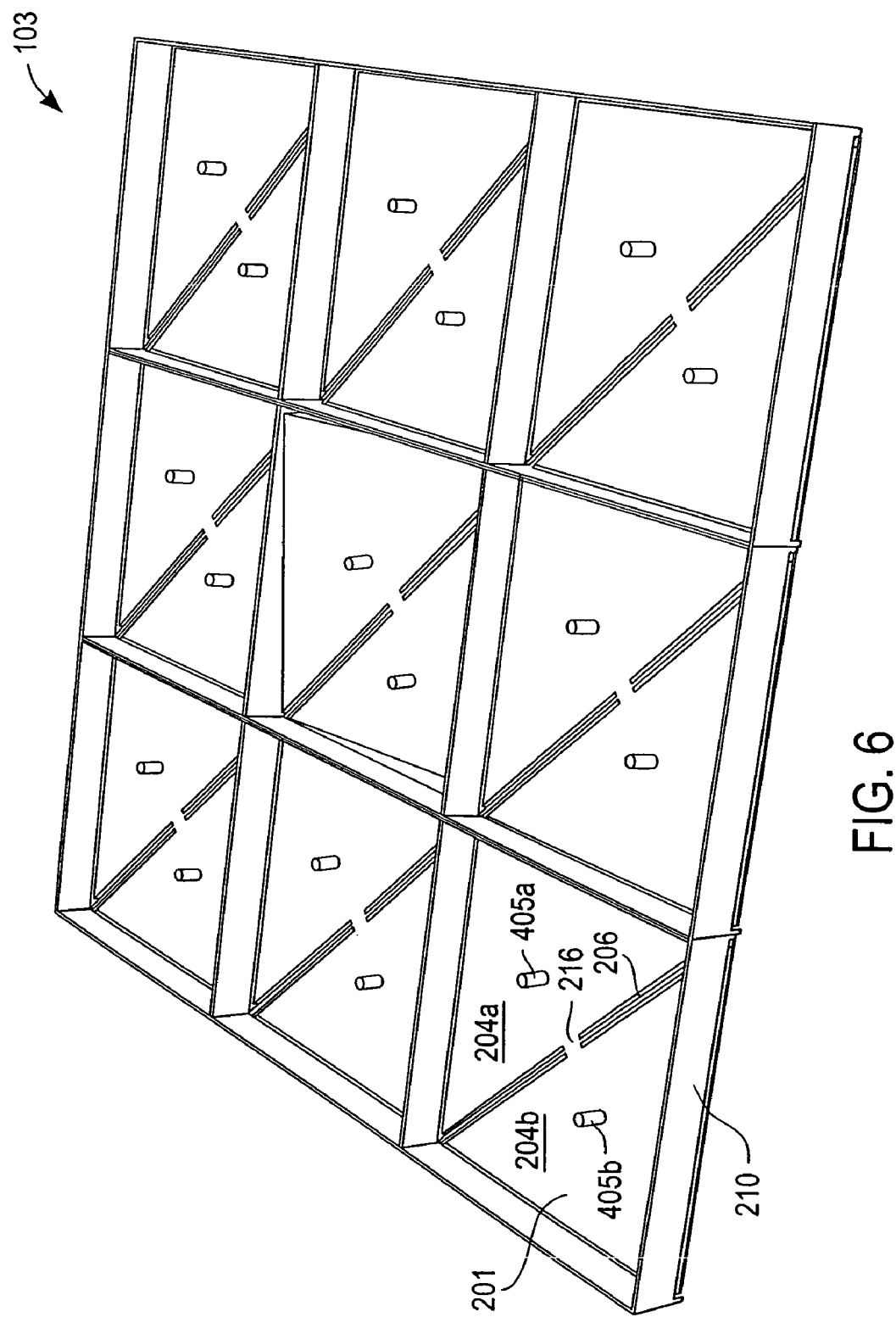
FIG. 6 is a perspective view showing the bottom and sides of a micro mirror array in one embodiment of the invention.

FIG. 6 is a perspective view showing the bottom and sides of the micro mirror array 103 having nine micro mirrors. As shown in FIG. 6, the support walls of the spacer support frame 210 of the micro mirrors 202 define cavities beneath the mirror plates 204. These cavities provide room for the mirror plates 204 to deflect downwards, and also allow large areas beneath the mirror plates 204 for placement of the second layer 104 with the electrodes 126, and/or the third layer with the control circuitry 106. FIG. 6 also shows the lower surface 201 of the mirror plates 204 (including sides 204a and 204b), as well as the bottoms of the spacer support frame 210, the torsion spring hinges 206, the connectors 216, and the motion stops 405a and 405b.

As seen in FIGS. 5 and 6, very little light that is normal to the mirror plate 204 can pass beyond the micro mirror array 103 to reach any the electrodes 126 or control circuitry 106 beneath the micro mirror array 103. This is because the spacer support frame 210 and the reflective surface 203 on the upper surface 205 of the mirror plate 204 and above a portion of the hinge 206 provide near complete coverage for the circuitry beneath the micro mirror array 103. Also, since the spacer support frame 210 separates the mirror plate 204 from the circuitry beneath the micro mirror array 103, light traveling at a non-perpendicular angle to the mirror plate 204 and passing beyond the mirror plate 204 is likely to strike a wall of the spacer support frame 210 and not reach the circuitry beneath the micro mirror array 103. Since little intense light incident on the mirror array 103 reaches the circuitry, the SLM 100 avoids problems associated with intense light striking the circuitry; These problems include the incident light heating up the circuitry, and the incident light photons charging circuitry elements, both of which can cause the circuitry to malfunction.

Figure 14:
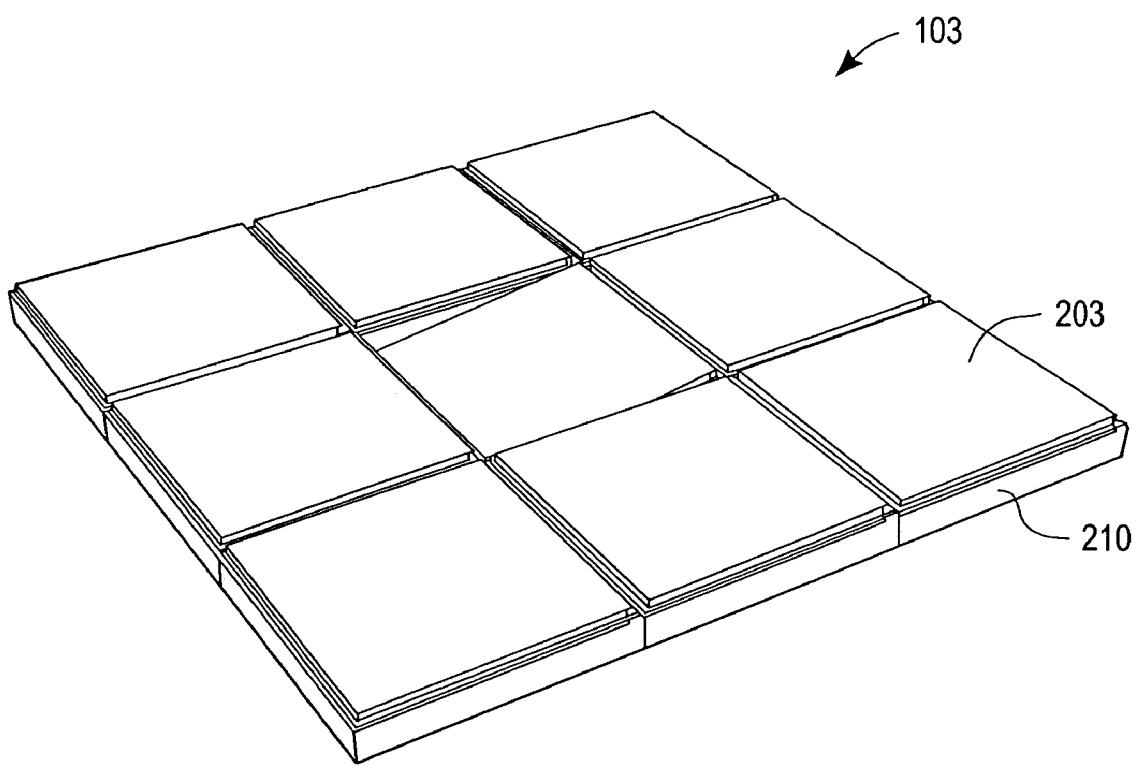
FIG. 14 is a perspective view showing the top and sides of a micro mirror array in an alternate embodiment of the invention.
Figure 15:
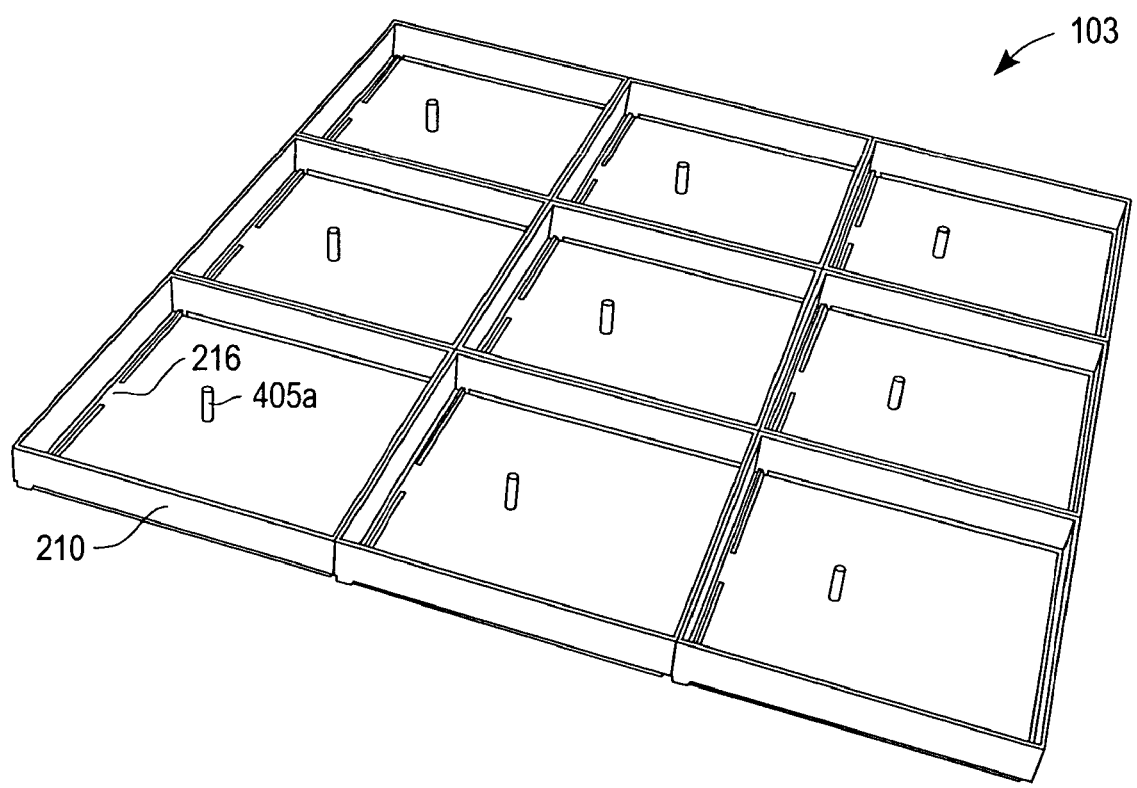
FIG. 15 is a perspective view showing the bottom and sides of a micro mirror array in the alternate embodiment shown in FIG. 14.

FIG. 12a is a perspective view of a micro mirror 202 according to an alternate embodiment of the invention, and FIG. 12b is a more detailed perspective view of a corner 238 of the micro mirror 202. The torsion hinge 206 in this embodiment is parallel to a spacer support wall of the spacer support frame 210. The mirror plate 204 is selectively deflected toward the electrode by applying a voltage bias between the mirror plate 204 and a corresponding electrode 126. The embodiment illustrated in FIG. 12a provides for less total range of angular motion from the same support wall height than the mirror 202 illustrated in FIGS. 2a and 2b with the diagonal hinge 206. Nevertheless, like the embodiment illustrated in FIGS. 2a and 2b, the hinge 206 in the embodiment illustrated in FIGS. 12a and 12b is below the upper surface 205 of the mirror plate 204 and is concealed by a reflective surface 203, resulting in an SLM 100 with high fill ratio, high optical efficiency, high contrast ratio, low diffraction and scattering of light and reliably and cost-effective performance. FIG. 12b is a more detailed perspective view of a corner of the micro mirror 202 and illustrates the mirror plate 204, hinge 206, support wall of the spacer support frame 210 and reflective surface 203. FIG. 13 illustrates the underside of a single micro mirror 202 including hinge 206, connector 216 and motion stop 405a. In other embodiments, the hinge 206 may be substantially parallel to one of the sides of the mirror plate 204 and still be positioned to divide the mirror plate 204 into two parts 405a and 405b. FIGS. 14 and 15 provide perspective views of a micro mirror array composed of multiple micro mirrors 202 as described in FIGS. 12a, 12b and 13.

Figure 9A:
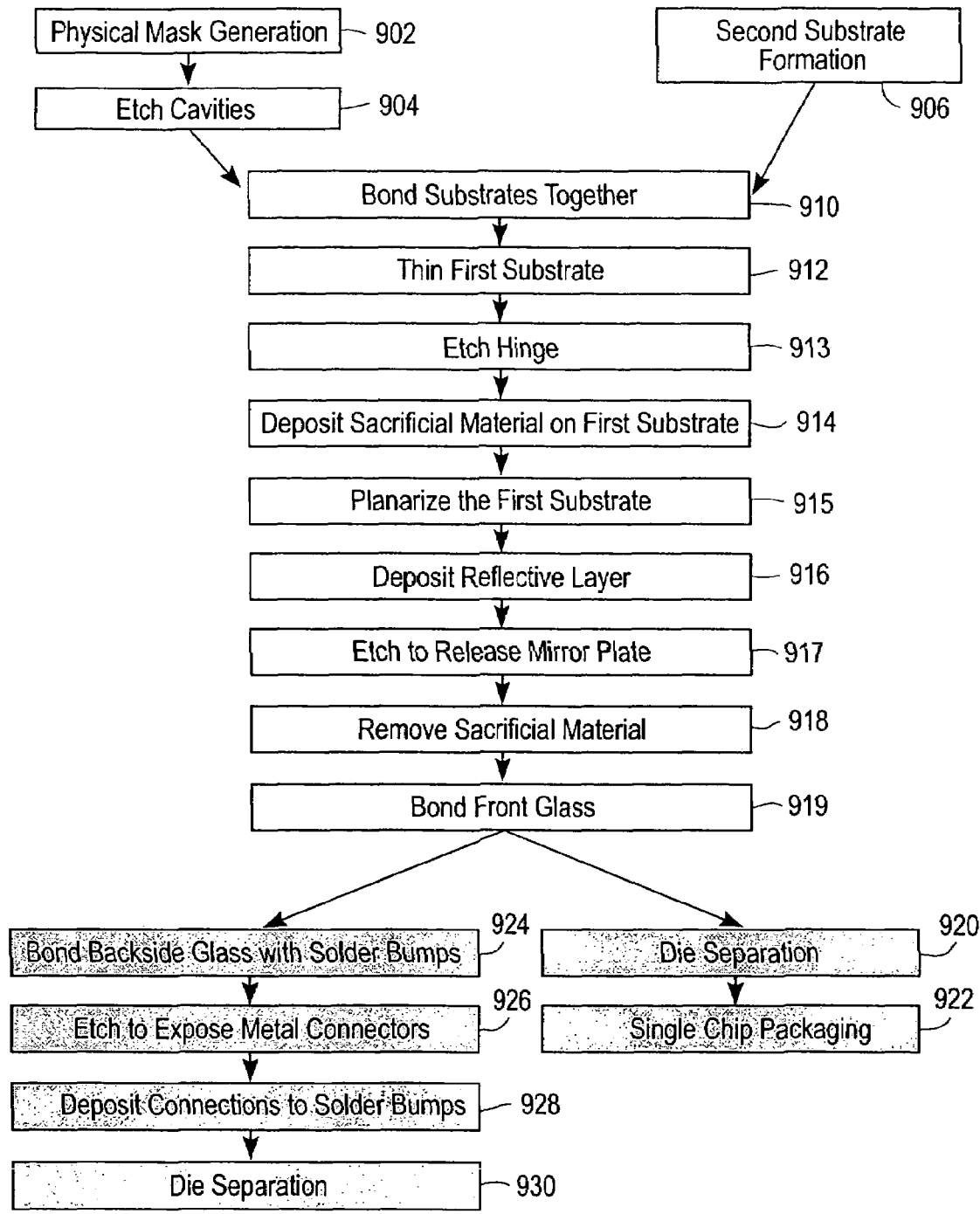
FIG. 9a is a flowchart illustrating a preferred embodiment of how the spatial light modulator is fabricated.

Fabrication of the Spatial Light Modulator:

FIG. 9a is a flowchart illustrating one preferred embodiment of how the spatial light modulator 100 is fabricated. FIGS. 9b through 9m are diagrams illustrating a preferred method the fabrication of the spatial light modulator 100 in more detail, and FIGS. 16a through 16e, along with FIGS. 9e through 9m are diagrams illustrating an alternative preferred method of fabrication.

Figure 10:
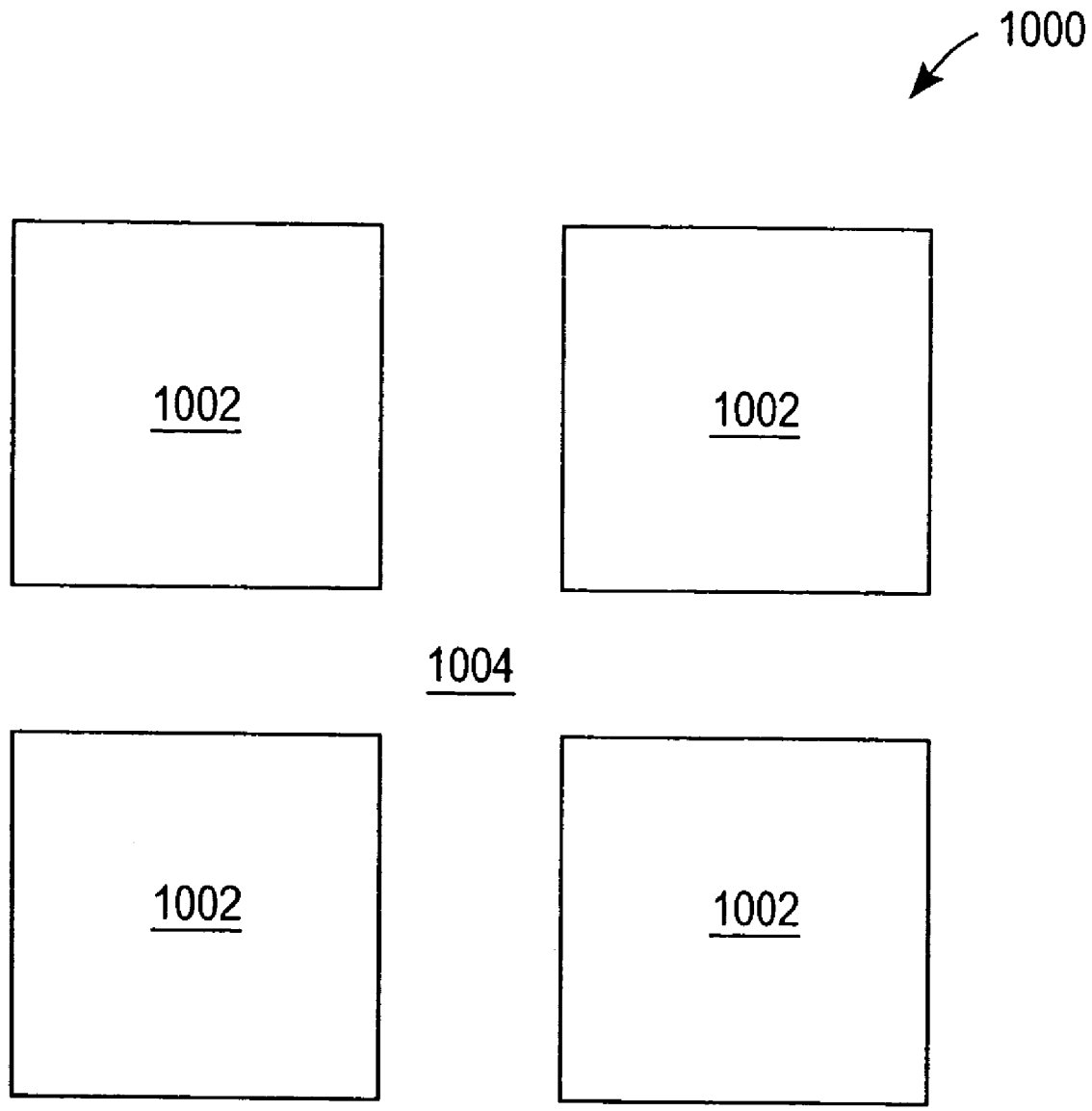
FIG. 10 illustrates a preferred embodiment of a mask for forming cavities in the first substrate.

Referring to FIG. 9a, a mask is generated 902 to initially partially fabricate the micro mirrors 202. A preferred embodiment of this mask 1000 is illustrated in FIG. 10 and defines what will be etched 904 from one side of the first substrate 105 to form the cavities on the underside of the micro mirror array 103 that define the spacer support frames 210 and support walls. As shown in FIG. 10, area 1004 of the mask 1000 is a photoresist material or other dielectric material, such as silicon oxide or silicon nitride, that will prevent the first substrate 105 beneath from being etched. The areas 1002 in FIG. 10 are areas of exposed substrate 105 that will be etched to form the cavities. The areas 1004 that are not etched remain, and form the spacer support walls in the spacer support frame 210.

In one embodiment, the first substrate 105 is etched in a reactive ion etch chamber flowing with SF6, HBr, and oxygen gases at flow rates of 100 sccm, 50 sccm, and 10 sccm respectively. The operating pressure is in the range of 10 to 50 mTorr, the bias power is 60 W, and the source power is 300 W. In another embodiment, the first substrate 105 is etched in a reactive ion etch chamber flowing with Cl2, HBr, and oxygen gases at flow rates of 100 sccm, 50 sccm, and 10 sccm respectively. In these embodiments, the etch processes stop when the cavities are about 3–4 microns deep. This depth is measured using in-situ etch depth monitoring, such as in-situ optical interferometer techniques, or by timing the etch rate.

In another embodiment, the cavities are formed in the wafer by an anisotropic reactive ion etch process. The wafer is placed in a reaction chamber. SF6, HBr, and oxygen gases are introduced into the reaction chamber at a total flow rate of 100 sccm, 50 sccm, and 20 sccm respectively. A bias power setting of 50 W and a source power of 150W are used at a pressure of 50 mTorr for approximately 5 minutes. The wafers are then cooled with a backside helium gas flow of 20 sccm at a pressure of 1 mTorr. In one preferred embodiment, the etch processes stop when the cavities are about 3–4 microns deep. This depth is measured using in-situ etch depth monitoring, such as in-situ optical interferometer techniques, or by timing the etch rate.

Standard techniques, such as photolithography, can be used to generate the mask on the first substrate 105. As mentioned previously, in one preferred embodiment the micro mirrors 202 are formed from a single material, such as single crystal silicon. Thus, in one preferred embodiment, the first substrate 105 is a wafer of single crystal silicon. Note that typically multiple micro mirror arrays 103, to be used in multiple SLMs 100, are fabricated on a single wafer, to be separated later. The structures fabricated to create the micro mirror array 103 are typically larger than the features used in CMOS circuitry, so it is relatively easy to form the micro mirror array 103 structures using known techniques for fabricating CMOS circuitry.

Figure 9B:
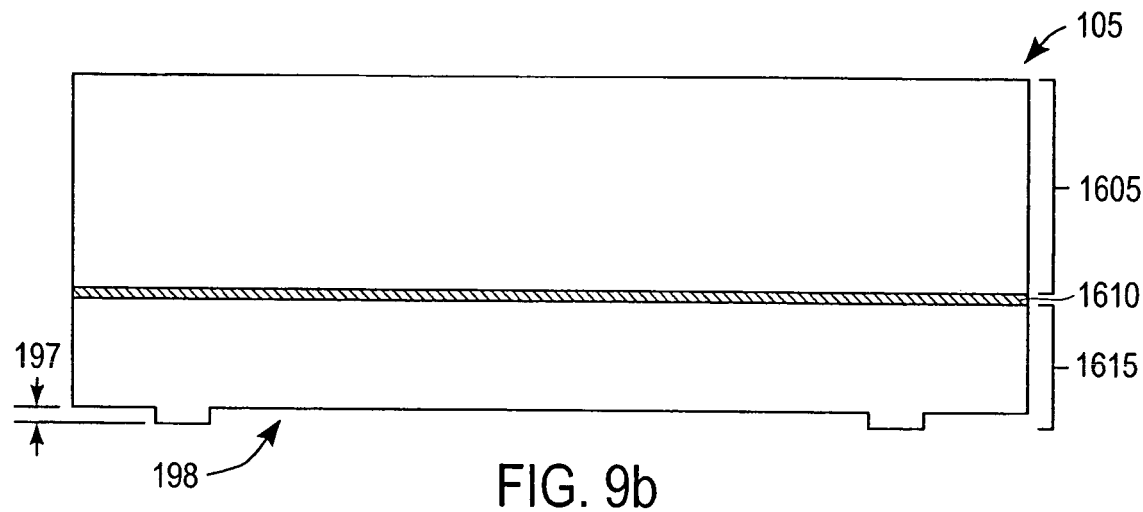
FIGS. 9b through 9m are cross sectional diagrams illustrating the fabrication of the spatial light modulator in greater detail.

FIG. 9b is a cross sectional view that illustrates the first substrate 105 prior to fabrication. Substrate 105 initially includes a device layer 1615 having a pre-determined thickness, an insulating oxide layer 1610 and a handling substrate 1605. The device layer 1615 is located on a first side of the substrate 105 and the handling substrate 1605 is located on a second side of the substrate 105. In a preferred embodiment, the device layer 1615 is made of a single crystal silicon material and has a thickness of between about 2.0 microns to about 3.0 microns. Substrate 105 as shown in FIG. 9b is fabricated using any standard silicon-on-insulator ("SOI") process known in the art or may be purchased from silicon wafer suppliers such as Soitec, Inc., Shinetsu, Inc. or Silicon Genesis, Inc.

Figure 9C:
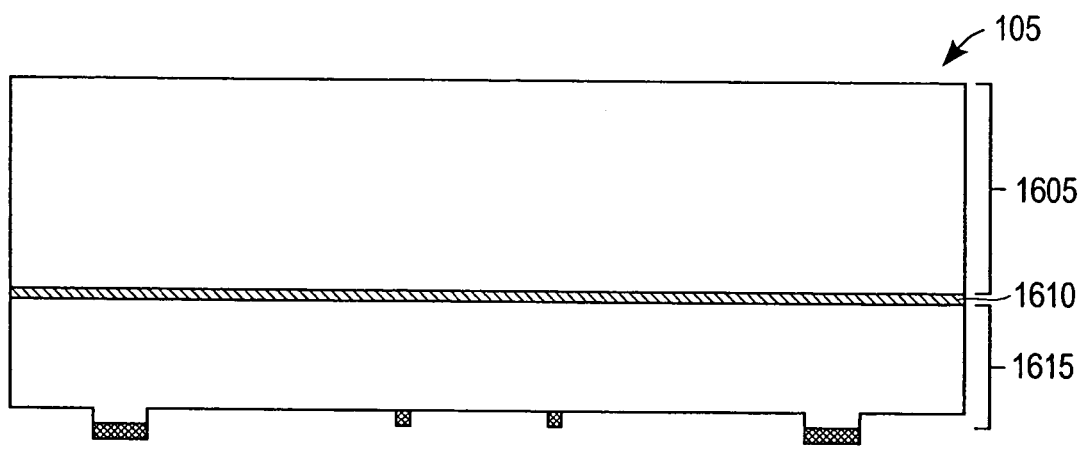
Figure 9D:
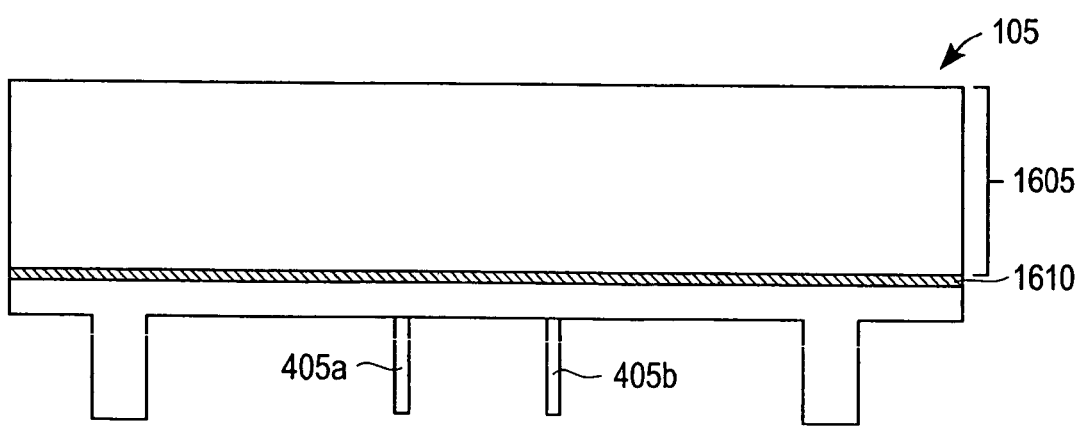

Referring to FIG. 9b, a shallow cavity 198 is etched into the device layer 1615 on the second side of the first substrate 105. The details of the etch are described in paragraphs above, specifically paragraphs 59–61 above. The etch depth is approximately the distance 197 between the end of the motion stops 405a and 405b (to be formed) and the second substrate 107 (after the second substrate 107 has been bonded to the first substrate 105, as discussed below). The distance 197 of this depth determines the length of the motion stops 405a and 405b that will ultimately be fabricated in a subsequent etch step. As shown in FIGS. 9c and 9d, two motion stops 405a and 405b are etched from the device layer 1615 of the first substrate 105, preferably using photolithography techniques. Again, the details of the etch are described in the above in paragraphs 59–61.

Figure 16A:
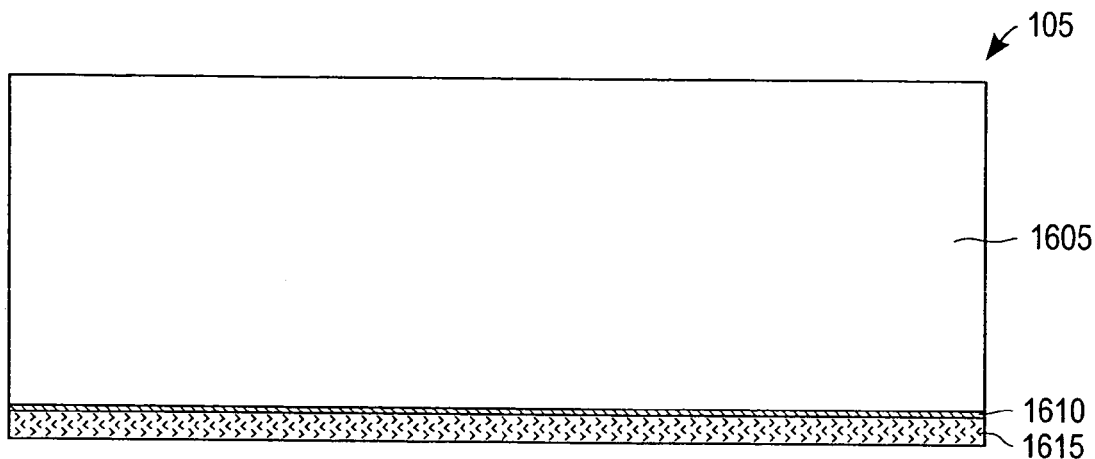
FIG. 16a through FIG. 16e are diagrams illustrating an alternative method of fabricating cavities in a first substrate.
Figure 16B:
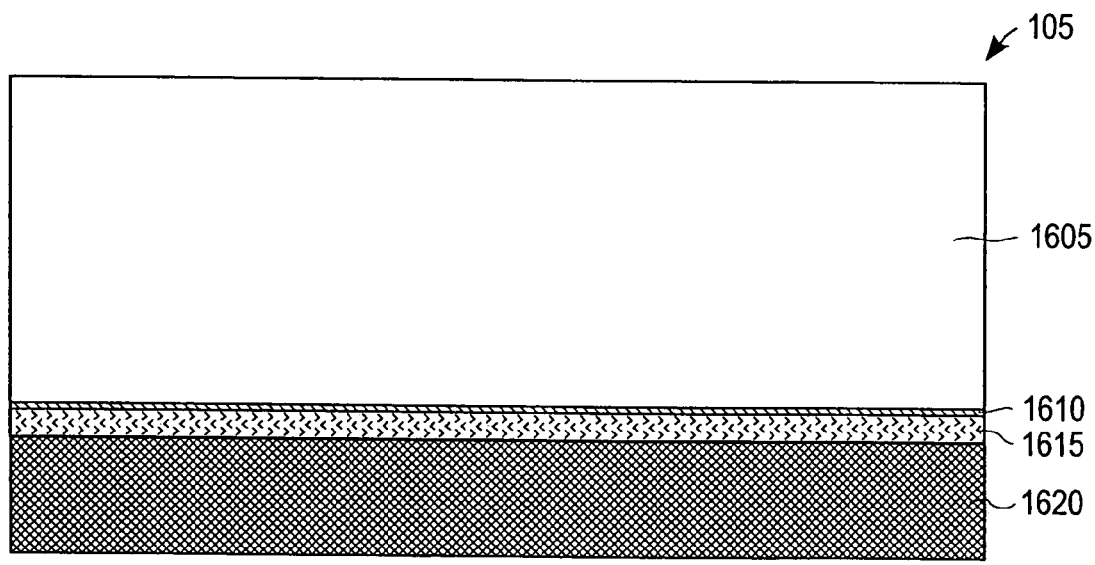
Figure 16C:
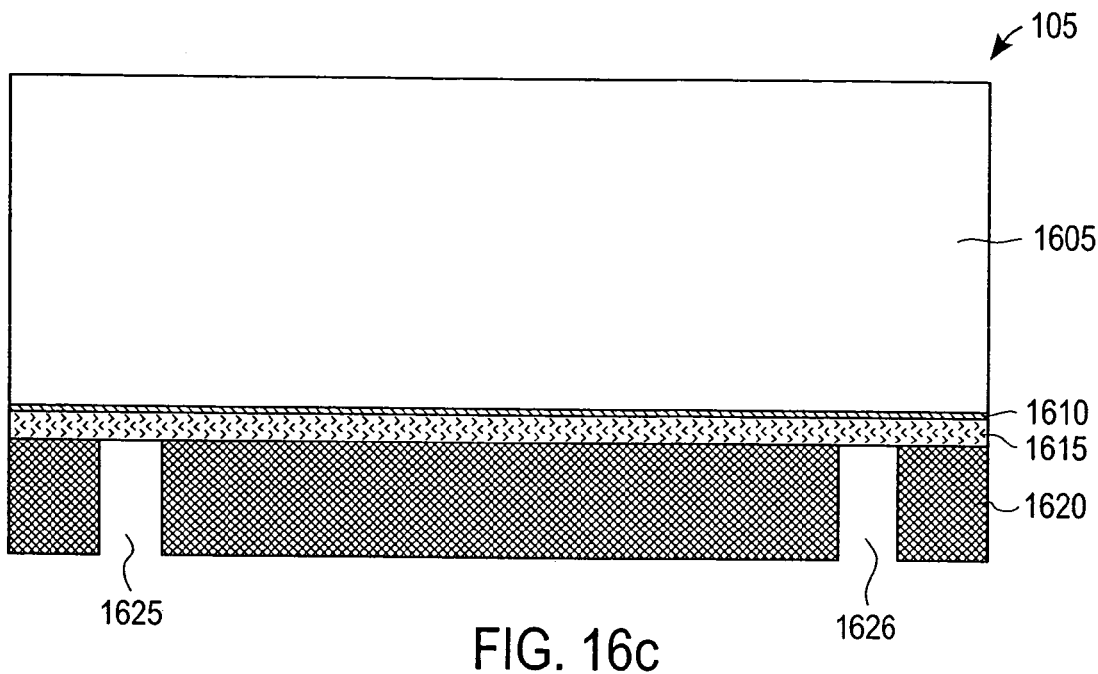
Figure 16D:
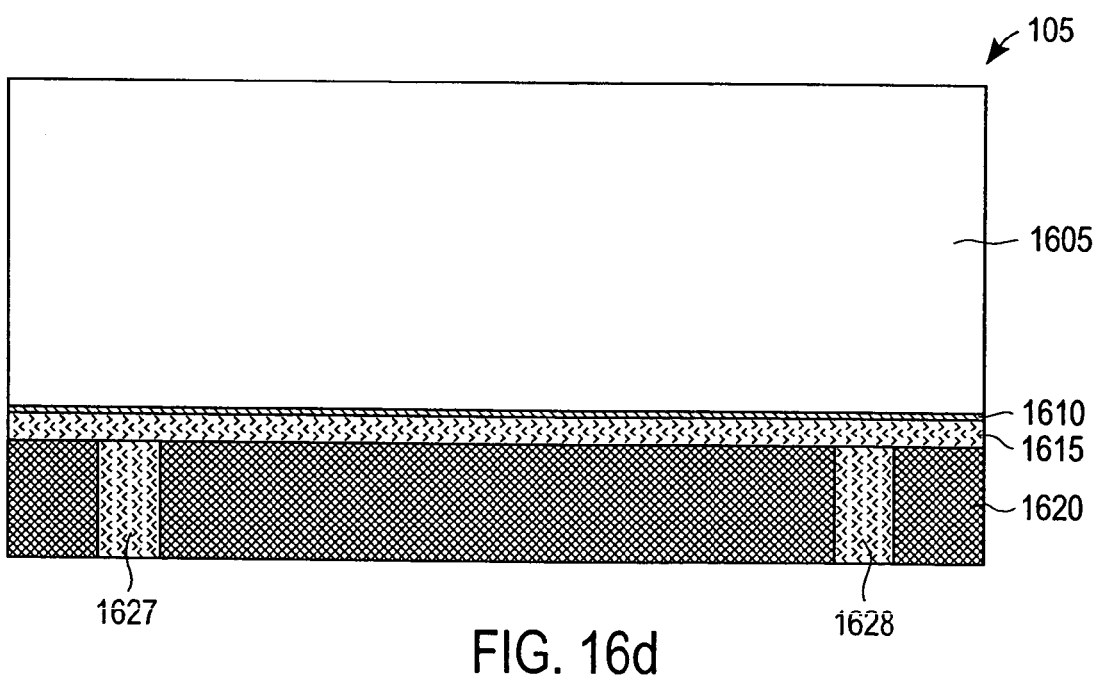
Figure 16E:
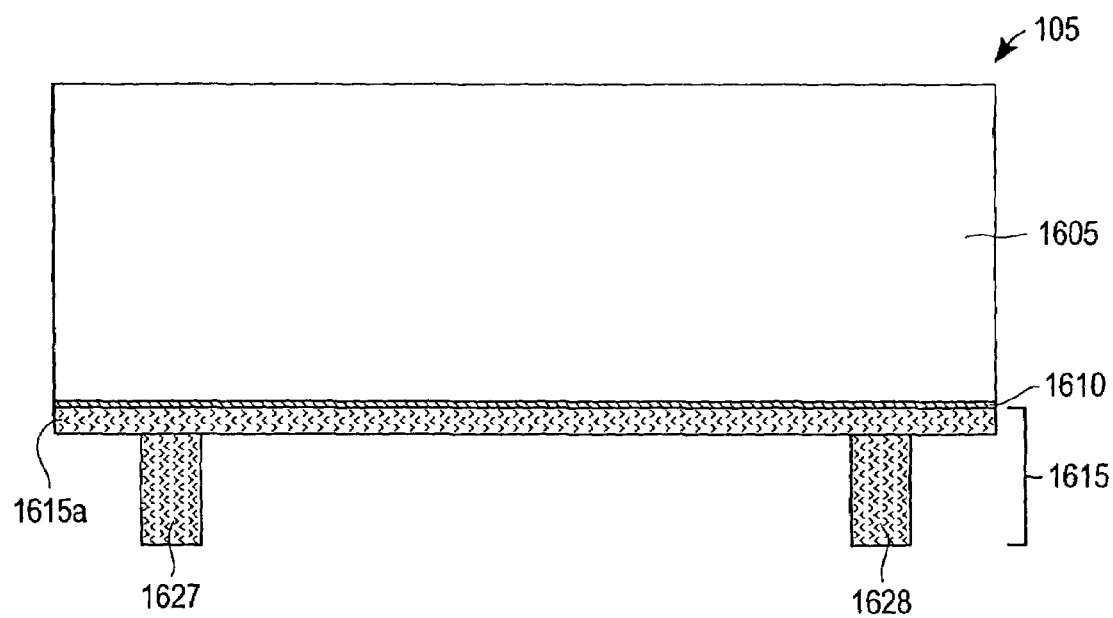

FIGS. 16a–16e illustrate an alternative method for fabricating a first substrate 105 with cavities. FIG. 16a presents a cross sectional view of the first substrate 105 prior to fabrication. Like the first substrate 105 in FIG. 9b, the first substrate 105 in FIG. 16a initially includes a device layer 1615 having a pre-determined thickness, an insulating oxide layer 1610 and a handling substrate 1605. The device layer 1615 is located on a first side of the substrate 105 and the handling substrate 1605 is located on a second side of the substrate 105. Such first substrates 105 may be fabricated using any standard silicon-on-insulator process known in the art or may be purchased from silicon wafer suppliers such as the ones described above. In this preferred embodiment, the device layer 1615 is made of a single crystal silicon material, and the top portion 1615a of the device layer 1615, as shown in FIG. 16e has a pre-determined thickness, preferably between 0.2 microns to 0.4 microns. The thickness of this top portion 1615a of the device layer will ultimately be the approximate thickness of the mirror plate 204 eventually fabricated.

Referring to FIG. 16b, after obtaining (either fabricating or purchasing) a first substrate 105 having the layers 1610 and 1615 and substrate 1605 described in the preceding paragraph, a dielectric material 1620, such as silicon oxide, is deposited on the device layer 1615 of the first substrate 105.

The dielectric material 1620 is then etched using standard photolithography and etching techniques known in the art to create openings 1625 and 1626 at pre-determined positions where the support walls of the spacer support frame 210 will be located. As shown in FIG. 16c, the etched dielectric material 1620 creates a mask and openings 1625 and 1626 for subsequent process steps.

In the preferred embodiment illustrated in FIG. 16c, a single crystal silicon material 1627 and 1628 is grown in the openings 1625 and 1626 of the dielectric material 1620 using an expitaxial growth process with the single crystal silicon material in device layer 1615 serving as the "seed" for the epitaxial growth. Typically, the material grown in the openings 1627 and 1628 is the same material as the device layer 1615 (or seed) and has the same crystal structure as the device layer 1615. In the embodiment shown in FIG. 16c, the single crystal silicon material grown 1627 and 1628 will ultimately become the support walls of the spacer support frame 210 for the micro mirror array 103.

Finally, the dielectric material 1620 is removed resulting in the structure shown in FIG. 16e. The result is a first substrate 105 having structure identical to the first substrate 105 shown in FIG. 9d, except the structure in FIG. 16e does not have the motion stops 405a or 405b. However, given the discussion above, one of ordinary skill in the art would know how to add the motion stops 405a or 405b to the structure shown in FIG. 16e. For example, such motion stops 405a and 405b may be etched and grown epitaxially just as the support walls of the spacer support frame 210. Thus, FIGS. 16a through 16e provide an alternative method for fabricating cavities in a first substrate 105 with precise control over the thickness of the top portion 1615a of the device layer 1615 of the first substrate 105. Completion of the steps illustrated in FIGS. 9e through 9m will result in the fabrication of a hidden hinge high fill ratio reflective spatial light modulator 100.

Figure 9E:
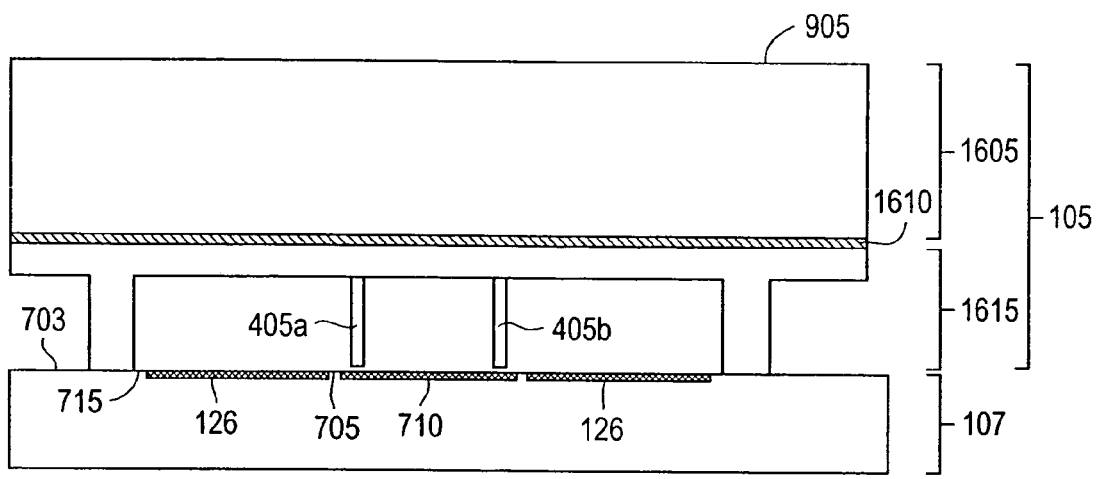

Returning to FIG. 9a, separately from the fabrication of the cavities in the first substrate 105, some or all of the electrodes 126, addressing and control circuitry 106 are formed 906 on a first side 703 of the second substrate 107 as shown in FIGS. 9a and 9e. The second substrate 107 may be a transparent material, such as quartz, or another material. If the second substrate is quartz, transistors may be made from polysilicon, as compared to crystalline silicon. The circuitry is preferably formed 906 using standard CMOS fabrication technology. For example, in one embodiment, the control circuitry 106 formed or fabricated 906 on the second substrate 107 includes an array of memory cells, row address circuitry, and column data loading circuitry. There are many different methods to make electrical circuitry that performs the addressing function. The DRAM, SRAM, and latch devices commonly known may all perform the addressing function. Since the mirror plate 204 area may be relatively large on semiconductor scales (for example, the mirror plate 204 may have an area of 225 square microns), complex circuitry can be manufactured beneath micro mirror 202. Possible circuitry includes, but is not limited to, storage buffers to store time sequential pixel information, circuitry to compensate for possible non-uniformity of mirror plate 204 to electrode 126 separation distances by driving the electrodes 126 at varying voltage levels, and circuitry to perform pulse width modulation conversions.

This control circuitry 106 is covered with a passivation layer such as silicon oxide or silicon nitride. Next, a metallization layer is deposited. This metallization layer is patterned and etched to define electrodes 126, as well as a bias/reset bus in one embodiment. The electrodes 126 are placed during fabrication so that one or more of the electrodes 126 corresponds to each micro mirror 202. As with the first substrate 105, typically multiple sets of circuitry to be used in multiple SLMs 100 are formed 906 on the second substrate 107 to be separated later.

Figure 9F:
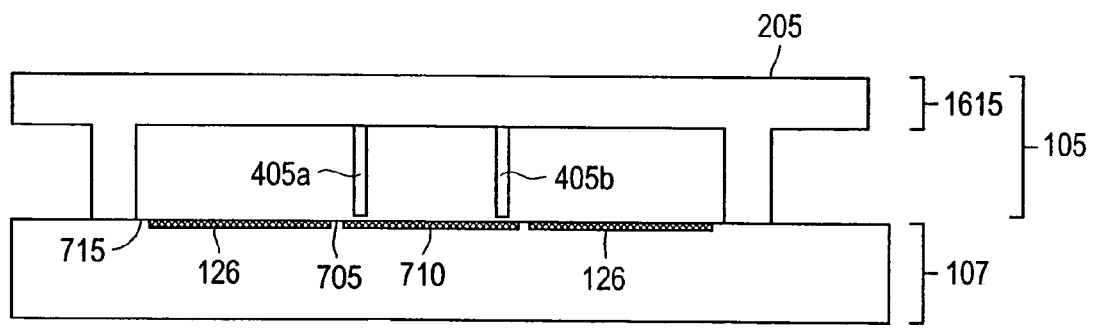

The first substrate 105 illustrated in FIG. 9d or FIG. 16e is then bonded 910 to the second substrate 107, as shown in FIGS. 9a and 9e. As shown in FIG. 9f, the first substrate 105 has a top layer 905 on the side opposite the second substrate 107. The side of the first substrate 105 with the cavities and the motion stops 405a and 405b is bonded 910 to the side of the second substrate that has the electrodes 126. The substrates 105 and 107 are aligned so that the electrodes on the second substrate 107 are in the proper position to control the deflection of the micro mirrors 202 in the micro mirror array 103. In one embodiment, the two substrates 105 and 107 are optically aligned using double focusing microscopes by aligning a pattern on the first substrate 105 with a pattern on the second substrate 107, and the two substrates 105 and 107 are bonded 910 together by low temperature bonding methods such as anodic or eutectic bonding. This bonding 910 in a preferred embodiment may occur at any temperature lower than 400 degrees Celsius including at room temperature. For example, thermoplastics or dielectric spin glass bonding materials can be used, so that the substrates 105 and 107 are bonded thermal-mechanically. The bonding 910 ensures a good mechanical adhesion between the first substrate 105 and the second substrate 107 and may occur at room temperature. FIG. 9e is a cross sectional view that shows the first substrate 105 and the second substrate 107 bonded together. There are many possible alternate embodiments to the fabrication of the second substrate 906.

After bonding 910 the first substrate 105 and the second substrate 107 together, the top layer 905 of the first substrate 105 is thinned 912 as illustrated in FIGS. 9f and 9a to a pre-determined, desired thickness. First, the handling substrate 1605 shown in FIG. 9f or FIG. 16e is removed, typically by grinding and/or etching, and then the oxide layer 1610 is stripped away using any technique known in the art for performing oxide stripping. The oxide layer 1610 serves as a stop marker for the thinning step 912 and is placed within the first substrate 105 to produce a thinned first substrate 105 of desired thickness. The thinning process may involve grinding and/or etching, preferably a silicon back etch process such as wet etch or plasma etch. The result is an upper surface 205 of the first substrate 105 that will ultimately form the upper surface 205 of the mirror plates as shown in FIGS. 3, 7a, 8 and 9m. The final thickness of the resulting first substrate 105 is several microns in a preferred embodiment.

Figure 9G:
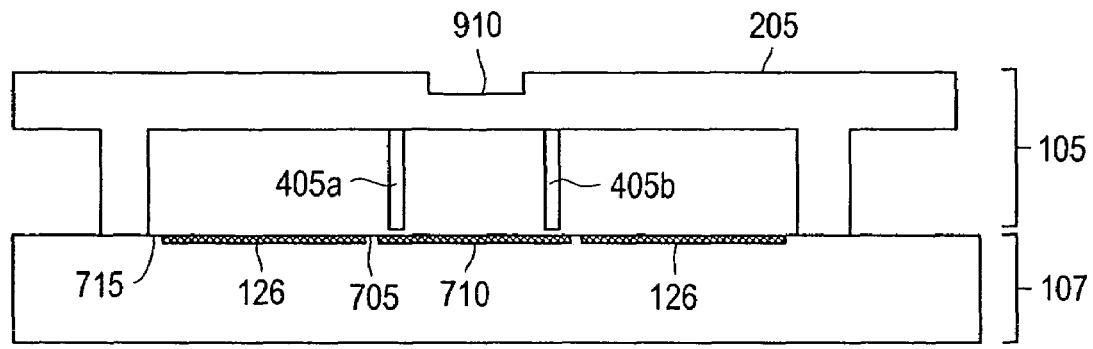
Figure 9H:
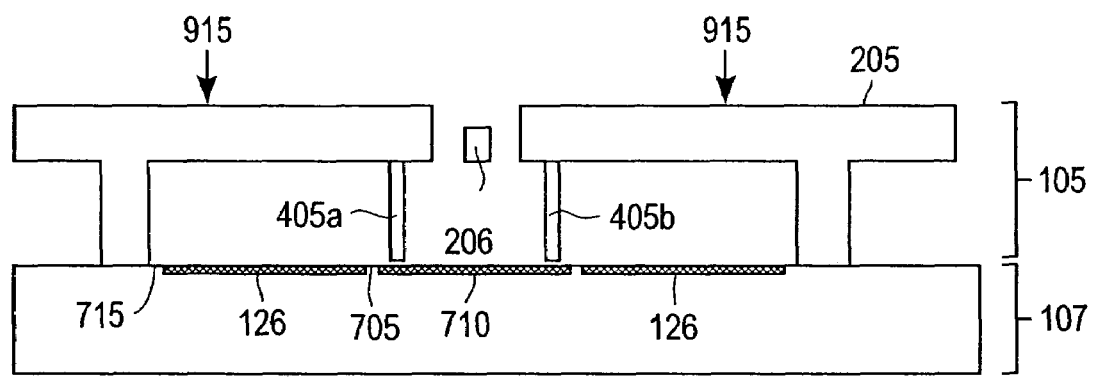

Next, a hinge 206 is etched 913 using a two step etch process. First, as shown in FIG. 9g, the upper surface 205 of the first substrate 105 is etched to form a recess 910. This ensures that the hinge 206 to be formed in the recess 910 is positioned substantially below the upper surface 205 of the first substrate 105, which will be the upper surface 205 of the mirror plate 204 at the end of the fabrication process. Second, as shown in FIGS. 9h and 9a, the first substrate 105 is etched again to substantially release the hinge 206 from the mirror plate portion 915 of the first substrate 105. As shown in the embodiments illustrated in FIGS. 3, 4a, 4b, 12a, 12b and 13, the ends of the hinge 206 remain connected to the spacer support walls of the spacer support frame 210. The mirror plate portion 915 of the first substrate 105 will form the mirror plate 204 of the micro mirror 202.

In one embodiment, the hinge 206 is etched in a decoupled plasma source chamber flowing with $Cl_2$, $O_2$, and $N_2$ gases at flow rates of 100 sccm, 20 sccm, and 50 sccm respectively. The operating pressure is in the range of 4 to 10 mTorr, the bias power is 40 W, and the source power is 1500 W. The depth is measured using in-situ etch depth monitoring, such as in-situ optical interferometer techniques, or by timing the etch rate.

Figure 9I:
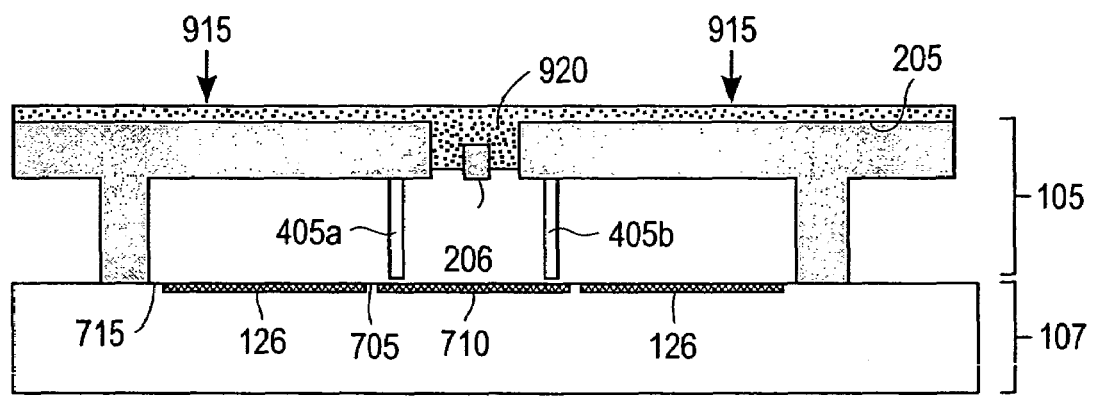

A sacrificial material 920, such as photoresist, is then deposited 914 onto the first substrate 105, filling the gaps on and around the hinge 206, including between the hinge 206 and the mirror plate portion 915 of the first substrate 105, and on the upper surface 205 of the first substrate 105, as shown in FIGS. 9i and 9a. The photoresist can be simply spun onto the substrate.

Figure 9J:
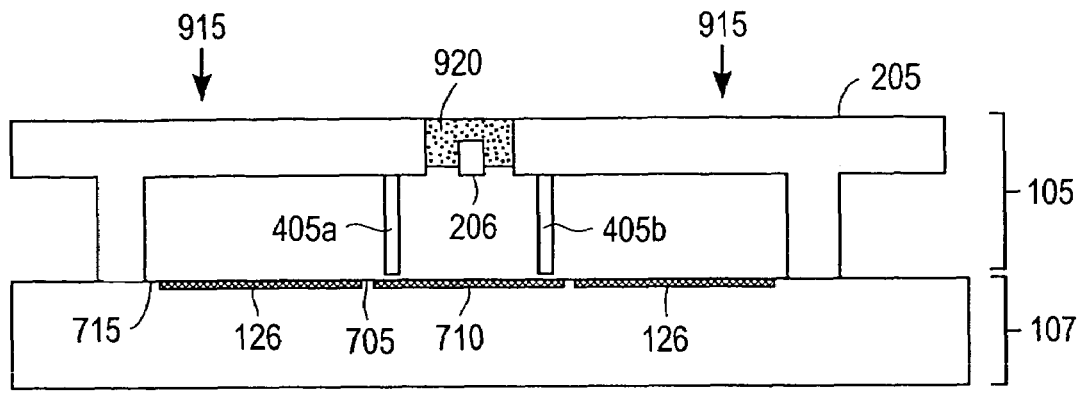

As illustrated in FIGS. 9j and 9a, the first substrate. 105 with the sacrificial material 920 is then planarized 915 using either a etch back step, a chemical mechanical processing ("CMP") process, or any other process known in the art. This process ensures that sacrificial material 920 is only left on and around the hinge, but not on the upper surface 205 of the first substrate 105. Note that, in the planarization step, since the sacrificial material 920 is removed from the upper surface 205 of the first substrate 105, removal is relatively easy.

Figure 9K:
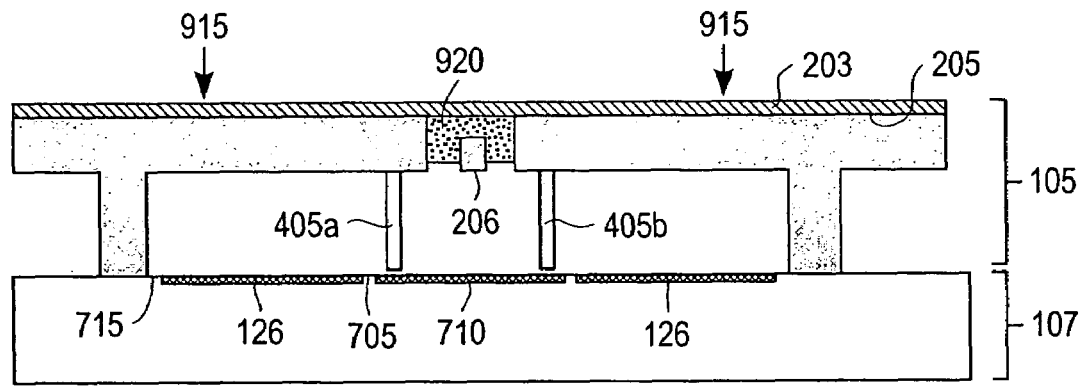

A reflective surface 203 is deposited 916 onto the planarized surface (including the upper surface 205 of the mirror plate 204 and the portion above a portion of the hinge 206 covered with sacrificial material 920) as shown in FIGS. 9k and 9a to create a reflective surface 203. As noted above, the reflective surface 203 has an area greater than the area of the upper surface 205 of the mirror plate 204. The reflective surface is preferably aluminum or any other reflective material known in the art, and preferably has thickness of 300A or less. The reflective surface 203 covers the upper surface 205 of the first substrate 105 and the area above a portion of the hinge 206. FIG. 9k is a cross sectional view that shows a deposited reflective surface 203. The thinness of the reflective surface 203 ensures that it inherits the flat, smooth characteristics of the upper surface 205 of the mirror plate 204.

Figure 9L:
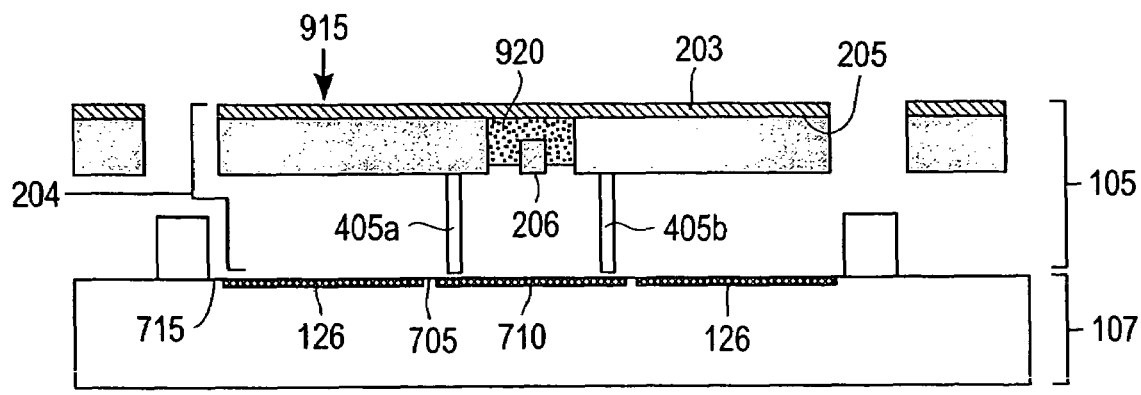
Figure 9M:
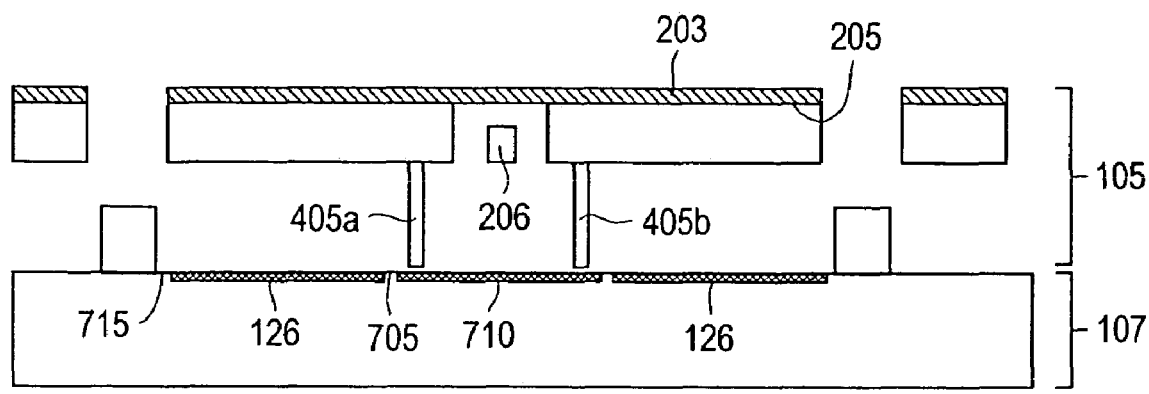

As shown in FIGS. 9l and 9a, the reflective surface 203 and the mirror plate portion 915 are etched 917 to release the mirror plate 204 from the mirror plate portion 915 of the first substrate 105. Preferably, the etch of the reflective surface 203 and the mirror plate portion 915 is conducted in the same chamber.

In a preferred embodiment in which the reflective surface 203 is an aluminum material, the etching 917 of the reflective surface 203 occurs in a decoupled plasma source chamber flowing with $Cl_2$, $BCl_3$, and $N_2$ gases at flow rates of 40 sccm, 40 sccm, and 10 sccm respectively. The operating pressure is 10 mTorr, the bias power is 75 W, and the source power is 800 W. The etch depth is measured using in-situ etch depth monitoring, such as in-situ optical interferometer techniques, or by timing the etch rate. After the reflective surface 203 of aluminum is etched 917, the underlying mirror plate portion 915 made of silicon, in a preferred embodiment, is then etched 917 in a decoupled plasma source chamber flowing with HBr, $Cl_2$, and $O_2$ gases at flow rates of 90 sccm, 55 sccm, and 5 sccm respectively. The operating pressure is 5 mTorr, the bias power is 75 W, and the source power is 500 W. The depth is measured using in-situ etch depth monitoring, such as in-situ optical interferometer techniques, or by timing the etch rate.

After etch 917 of the reflective surface 203 and the mirror plate portion 915, the mirror plate 204 is released; however, the hinge 206 is still fixed in place by the sacrificial material 920. As a result, the mirror plate 204 and the micro mirror as a whole cannot rotate around the hinge 206 yet, which ensures the survivability of the device in subsequent process steps.

The final step in the fabrication of the micro mirror 202 is to remove 918 the remaining sacrificial material 920 on and around the hinge 206. Note that removal of the remaining sacrificial material 920 on and around the hinge 206 is relatively easy since the sacrificial material 920 is not underneath the mirror plate 204 or mirror 202. A dry process, such as a plasma etch, is preferred due to a stiction problem associated with a wet process. In one embodiment, the sacrificial material 920 is a photoresist material that is etched away in an $O_2$ plasma chamber. After the sacrificial material 920 is removed 918, the hinge 206 is released and the mirror plate 204 is free to rotate about the hinge 206. By following the above fabrication steps, the result is a hinge 206 that is formed substantially beneath the upper surface 205 of the mirror plate 204 and is concealed by the reflective surface 203 that is deposited on the upper surface 203 of the mirror plate 204 and above a portion of the hinge 206.

In some embodiments, the micro-mirror array 103 is protected by a piece of glass or other transparent material. In one embodiment, during fabrication of the micro mirror array 103, a rim is left around the perimeter of each micro mirror array 103 fabricated on the first substrate 105. To protect the micro mirrors 202 in the micro mirror array 103, a piece of glass or other transparent material is bonded 919 to the rim as described in FIG. 9a. This transparent material protects the micro mirrors 202 from physical harm. In one alternative embodiment, lithography is used to produce an array of rims in a layer of photosensitive resin on a glass plate. Then epoxy is applied to the upper edge of the rims, and the glass plate is aligned and attached to the completed reflective SLM 100.

As discussed above, multiple SLMs 100 may be fabricated from the two substrates 105 and 107. Multiple micro mirror arrays 103 may be fabricated in the first substrate 105, and multiple sets of circuitry may be fabricated or formed in the second substrate 107. Fabricating multiple SLMs 100 increases the efficiency of the spatial light modulator 100 fabrication process. However, if multiple SLMs 100 are fabricated at once, they must be separated into the individual SLMs 100. There are many ways to separate each spatial light modulator 100 and ready it for use. In a first method, each spatial light modulator 100 is simply die separated 920 from the rest of the SLMs 100 on the combined substrates 105 and 107. Each separated spatial light modulator 100 is then packaged 922 using standard packaging techniques.

In a second method, a wafer-level-chip-scale packaging is carried out to encapsulate each SLM 100 into separate cavities and form electrical leads before the SLMs 100 are separated. This further protects the reflective deflectable elements and reduces the packaging cost. In one embodiment of this method as illustrated in FIG. 9a, the backside of the second substrate 107 is bonded 924 with solder bumps. The backside of the second substrate 107 is then etched 926 to expose metal connectors that were formed during fabrication of the circuitry on the second substrate 107. Next, conductive lines are deposited 928 between the metal connectors and the solder bumps to electrically connect the two. Finally, the multiple SLMs are die separated 930.

Figure 11:
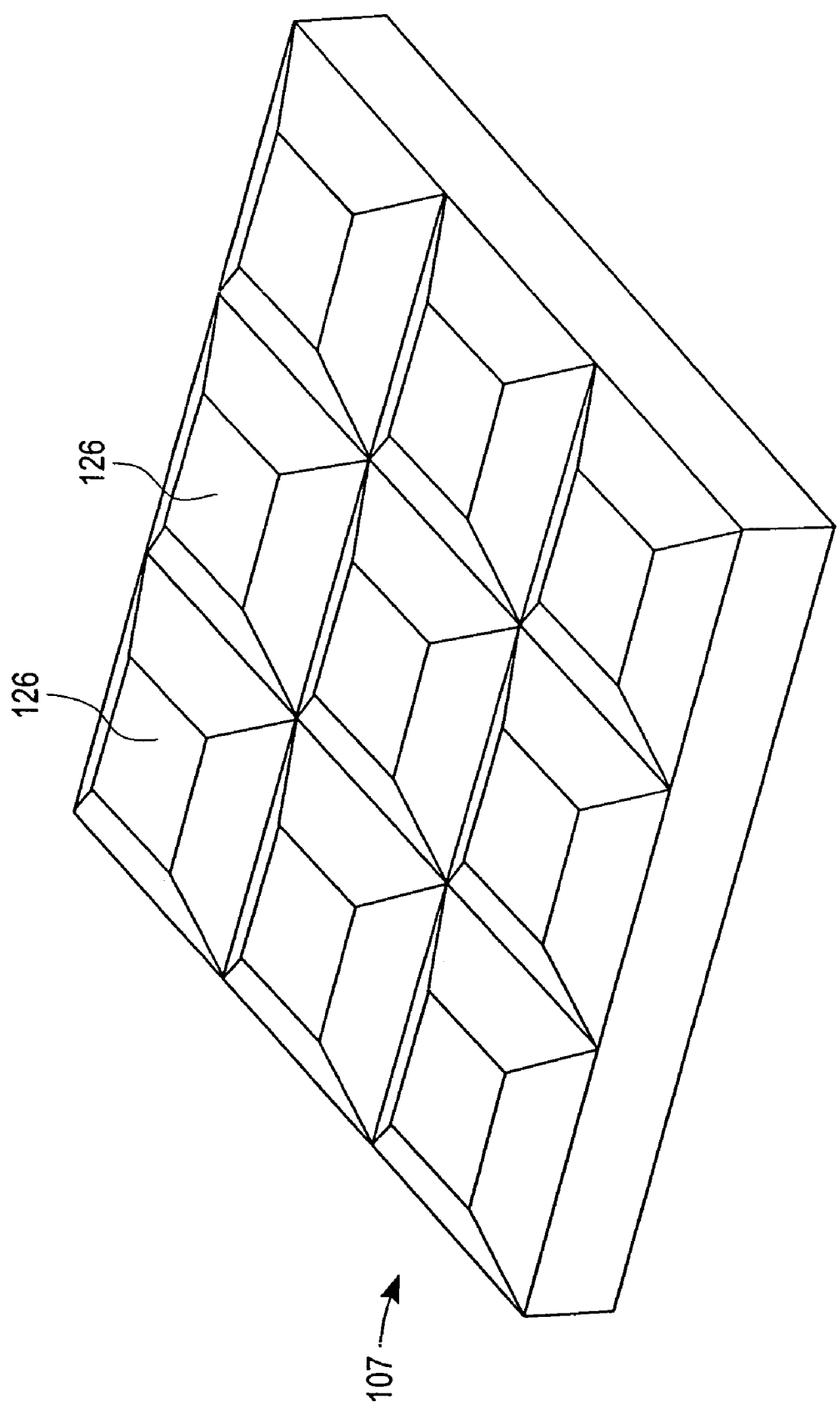
FIG. 11 is a perspective view of one embodiment of the electrodes formed on the second substrate.

FIG. 11 is a perspective view of one embodiment of the electrodes 126 formed on the second substrate 107. In this embodiment, each micro mirror 202 has a corresponding electrode 126. The electrodes 126 in this illustrated embodiment are fabricated to be higher than the rest of the circuitry on the second substrate 107. In a preferred embodiment, the electrodes 126 are located on the same level as the rest of the circuitry on the second substrate 107. In another embodiment, the electrodes 126 extend above the circuitry. In one embodiment of the invention, the electrodes 126 are individual aluminum pads that fit underneath the micro mirror plate. The shape of the electrodes depends upon the embodiment of the micro mirror 202. For example, in the embodiment shown in FIGS. 2a, 2b and 3, there are preferably two electrodes 126 underneath the mirror 202 with each electrode 126 having a triangular shape as shown in FIG. 7b. In the embodiment shown in FIGS. 12a, 12b and 13, there is preferably a single, square electrode 126 underneath the mirror 202. These electrodes 126 are fabricated on the surface of the second substrate 107. The large surface area of the electrodes 126 in this embodiment results in relatively low addressing voltages required to pull the mirror plate 204 down onto the mechanical stops, to cause the full predetermined angular deflection of the mirror plates 204.

Operation:

In operation, individual reflective micro mirrors 202 are selectively deflected and serve to spatially modulate light that is incident to and reflected by the mirrors 202.

Figure 7C:
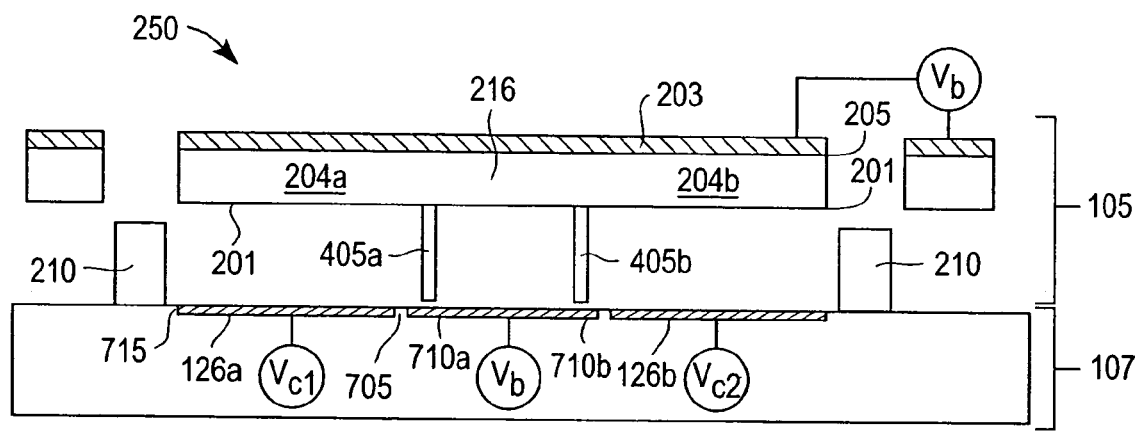
FIG. 7c is a cross sectional view of the undeflected micro mirror shown in FIG. 2a along a center diagonal cross section.

FIGS. 7a and 8 illustrate a cross-sectional view of the micro mirror 202 shown along dotted line 250 in FIG. 2a. Note that this cross-sectional view is offset from the center diagonal of the micro mirror 202, thereby illustrating the outline of the hinge 206. FIG. 7c illustrates a different cross-section view of the micro mirror 202 shown along dotted line 250 in FIG. 2a. Note that this cross-sectional view is along the center diagonal, perpendicular to the hinge 206. FIG. 7c illustrates the connector 216 in relation to the mirror plates 204a and 204b. FIGS. 7a, 7c and 8 show the micro mirror 202 above an electrode 126. In operation, a voltage is applied to an electrode 126 on one side of the mirror 202 to control the deflection of the corresponding part of the mirror plate 204 above the electrode 126 (side 204a in FIG. 8). As shown in FIG. 8, when a voltage is applied to the electrode 126, half of the mirror plate 204a is attracted to the electrode 126 and the other half of the mirror plate 204b is moved away from the electrode 126 and the second substrate 107 due to the structure and rigidity of the mirror plate 204. This causes the mirror plate 204 to rotate about the torsion spring hinge 206. When the voltage is removed from the electrode 126, the hinge 206 causes the mirror plate 204 to spring back to its unbiased position as shown in FIG. 7a. Alternatively, in the embodiment with the diagonal hinge 206 illustrated in FIGS. 2a, 2b and 3, a voltage may be applied to the electrode 126 on the other side of the mirror plate 204 to deflect the mirror 202 in the opposite direction. Thus, light striking the mirror 202 is reflected in a direction that can be controlled by the application of voltage to the electrode 126.

One embodiment is operated as follows. Initially the mirror 202 is undeflected as shown in FIGS. 7a and 7c. In this unbiased state, an incoming light beam, from a light source, obliquely incident to SLM 100 is reflected by the flat mirror 202. The outgoing, reflected light beam may be received by, for example, an optical dump. The light reflected from the undeflected mirror 202 is not reflected to a video display.

When a voltage bias is applied between half of the mirror plate 204a and the electrode 126 below it, the mirror 202 is deflected due to electrostatic attraction. In one embodiment, when the mirror plate 204a is deflected downward as shown in FIG. 8, $V_{e1}$ is preferably 12 volts, $V_b$–10 volts and $V_{e2}$ 0 volts. Similarly (or conversely), when the micro plate 204b is deflected downward, $V_{e1}$ is preferably 0 volts, $V_b$–10 volts and $V_{e2}$ 12 volts. Because of the design of the hinge 206, one side of the mirror plate 204a or 204b (namely, the side above the electrode 126 having a voltage bias), is deflected downward (towards the second substrate 107) and the other side of the mirror plate 204b or 204a is moved away from the second substrate 107. Note that in one preferred embodiment substantially all the bending occurs in the hinge 206 rather than the mirror plate 204. This may be accomplished in one embodiment by making the hinge width 222 thin, and connecting the hinge 206 to the support posts only on both ends. The deflection of the mirror plate 204 is limited by motion stops 405a or 405b, as described above. The full deflection of the mirror plate 204 deflects the outgoing reflected light beam into the imaging optics and to the video display.

When the mirror plate 204 deflects past the "snapping" or "pulling" voltage (approximately 12 volts or less in one embodiment), the restoring mechanical force or torque of the hinge 206 can no longer balance the electrostatic force or torque and the half of the mirror plate 204 having the electrostatic force under it, 204a or 204b, "snaps" down toward the electrode 126 under it to achieve full deflection, limited only by the motion stop 405a or 405b, as applicable. In the embodiment where the hinge 206 is parallel to a support wall of the spacer support frame 210 as shown in FIGS. 12a, 12b and 13, to release the mirror plate 204 from its fully deflected position, the voltage must be turned off. In the embodiment where the hinge 206 is diagonal as shown in FIGS. 2a, 2b and 3, to release the mirror plate 204 from its fully deflected position, the voltage must be turned off while the other electrode is being energized and the mirror 202 is attracted to the other side.

The micro mirror 202 is an electromechanically bistable device. Given a specific voltage between the releasing voltage and the snapping voltage, there are two possible deflection angles at which the mirror plate 204 may be, depending on the history of mirror 202 deflection. Therefore, the mirror 202 deflection acts as a latch. These bistability and latching properties exist since the mechanical force required for deflection of the mirror 202 is roughly linear with respect to deflection angle, whereas the opposing electrostatic force is inversely proportional to the distance between the mirror plate 204 and the electrode 126.

Since the electrostatic force between the mirror plate 204 and the electrode 126 depends on the total voltage difference between the mirror plate 204 and the electrode 126, a negative voltage applied to a mirror plate 204 reduces the positive voltage needed to be applied to the electrode 126 to achieve a given deflection amount. Thus, applying a voltage to a mirror array 103 can reduce the voltage magnitude requirement of the electrodes 126. This can be useful, for example, because in some applications it is desirable to keep the maximum voltage that must be applied to the electrodes 126 below 12V because a 5V switching capability is more common and cost-effective in the semiconductor industry.

Since the maximum deflection of the mirror 202 is fixed, the SLM 100 can be operated in a digital manner if it is operated at voltages past the snapping voltage. The operation is essentially digital because, in the embodiment where the hinge 206 is parallel to a support wall of the spacer support frame 210 as shown in FIGS. 2a, 2b and 3, the mirror plate 204 is either fully deflected downward by application of a voltage to the associated electrode 126 or is allowed to spring upward, with no voltage applied to the associated electrode 126. In the embodiment with the hinge 206 diagonal as shown in FIGS. 12a, 12b and 13, the mirror plate 204 is either fully deflected downward by application of a voltage to the associated electrode 126 on one side of the mirror plate 204 or deflected downward to the other side of the mirror plate 204 when energizing the other electrode 126 on the other side of the mirror plate 204. A voltage that causes the mirror plate 204 to fully deflect downward until stopped by the physical elements that stop the deflection of the mirror plate 204 is known as a "snapping" or "pulling" voltage. Thus, to deflect the mirror plate 204 fully downward, a voltage equal or greater to the snapping voltage is applied to the corresponding electrode 126. In video display applications, when the mirror plate 204 is fully deflected downward, the incident light on that mirror plate 204 is reflected to a corresponding pixel on a video display screen, and the pixel appears bright. When the mirror plate 204 is allowed to spring upward, the light is reflected in such a direction so that it does not strike the video display screen, and the pixel appears dark.

During such digital operation, it is not necessary to keep the full snapping voltage on an electrode 126 after an associated mirror plate 204 has been fully deflected. During an "addressing stage," voltages for selected electrodes 126 that correspond to the mirror plates 204 which should be fully deflected are set to levels required to deflect the mirror plates 204. After the mirror plates 204 in question have deflected due to the voltages on electrodes 126, the voltage required to hold the mirror plates 204 in the deflected position is less than that required for the actual deflection. This is because the gap between the deflected mirror plate 204 and the addressing electrode 126 is smaller than when the mirror plate 204 is in the process of being deflected. Therefore, in the "hold stage" after the addressing stage the voltage applied to the selected electrodes 126 can be reduced from its original required level without substantially affecting the state of deflection of the mirror plates 204. One advantage of having a lower hold stage voltage is that nearby undeflected mirror plates 204 are subject to a smaller electrostatic attractive force, and they therefore remain closer to a zero-deflected position. This improves the optical contrast ratio between the deflected mirror plates 204 and the undeflected mirror plates 204.

With the appropriate choice of dimensions (in one embodiment, spacer support frame 210 separation between the mirror plate 204 and the electrode 126 of 1 to 5 microns depending on mirror structure and deflection angle requirements, and hinge 206 thickness of 0.05 to 0.45 microns) and materials (such as single crystal silicon (100)), a reflective SLM 100 can be made to have an operating voltage of only a few volts. The shear modulus of the torsion hinge 206 made of single crystal silicon may be, for example, $5\times10^{10}$ Newton per meter-squared per radium. The voltage at which the electrode 126 operates to fully deflect the associated mirror plate 204 can be made even lower by maintaining the mirror plate 204 at an appropriate voltage (a "negative bias"), rather than ground. This results in a larger deflection angle for a given voltage applied to an electrode 126. The maximum negative bias voltage is the releasing voltage, so when the addressing voltage reduced to zero the mirror plate 204 can snap back to the undeflected position It is also possible to control the mirror plate 204 deflections in a more "analog" manner. Voltages less than the "snapping voltage" are applied to deflect the mirror plate 204 and control the direction in which the incident light is reflected.

Alternate Applications:

Aside from video displays, the spatial light modulator 100 is also useful in other applications. One such application is in maskless photolithography, where the spatial light modulator 100 directs light to develop deposited photoresist. This removes the need for a mask to correctly develop the photoresist in the desired pattern.

Although the invention has been particularly shown and described with reference to multiple embodiments, it will be understood by persons skilled in the relevant art that various changes in form and details can be made therein without departing from the spirit and scope of the invention. For example, the mirror plates 204 may be deflected through methods other than electrostatic attraction as well. The mirror plates 204 may be deflected using magnetic, thermal, or piezo-electric actuation instead.

We claim:

1. A method of fabricating a spatial light modulator, comprising: forming a first substrate defining a cavity; fabricating an electrode on a second substrate; bonding the first substrate to the second substrate; and forming a hinge and mirror plate on the first substrate; and applying a reflective surface on a mirror plate and above a portion of the hinge, the reflective surface having an area greater than an area of the upper surface of the mirror plate.

2. The method of claim 1, wherein the reflective surface substantially conceals the hinge associated with the mirror plate.

3. The method of claim 1, wherein the hinge is formed substantially beneath an upper surface of the mirror plate and is substantially concealed by the reflective surface.

4. The method of claim 1, wherein the first substrate in the spatial light modulator is a single piece of material.

5. The method of claim 1, wherein the first substrate in the spatial light modulator is single crystal silicon.

6. The method of claim 1, further comprising forming a motion stop on a lower surface of the mirror plate.

7. The method of claim 6, further comprising forming a landing tip on the second substrate at a position to receive the motion stop.

8. The method of claim 1 further comprising, prior to bonding the first substrate to the second substrate, fabricating addressing and control circuitry on the second substrate.

9. The method of claim 1 wherein a center height of the hinge is substantially coplanar with a center height of the mirror plate.

10. The method of claim 1 wherein the cavity is bounded by spacer support walls on a spacer support frame in the first substrate.

11. The method of claim 1 wherein the circuitry is formed using CMOS techniques.

12. The method of claim 1 wherein forming a first substrate defining a cavity comprises: obtaining the first substrate having a device layer of pre-determined thickness; depositing a dielectric material on the device layer of the first substrate; etching the dielectric material to create an opening at a pre-determined location; growing in the opening a material having the same crystal structure as the device layer; and removing the dielectric layer.

13. The method of claim 12, wherein the device layer is a single crystal silicon material and wherein the first substrate includes an insulating oxide layer on the device layer and a handling substrate on the insulating oxide layer.

14. The method of claim 12, wherein the device layer has a thickness of between 0.2 microns and 0.4 microns.

15. The method of claim 12, wherein the dielectric material is silicon oxide.

16. The method of claim 12, wherein the material grown in the opening is grown by an epitaxial growth process.

17. The method of claim 1, wherein forming a first substrate defining a cavity comprises: putting a mask onto the first substrate, the mask having a first portion defining a location of the cavity, the first portion exposing the first substrate underneath the first portion to be etched, and a second portion defining locations of support walls that define the cavity, the second portion capable of preventing the first substrate underneath the second portion from being etched; etching the first substrate beneath the first portion of the mask to a pre-determined depth; and removing the mask from the substrate.

18. The method of claim 1, wherein fabricating an electrode on a second substrate comprises: covering a control circuitry with a passivation layer; depositing a metallization layer on the passivation layer; patterning the metallization layer in a pattern that will define the electrode; and etching the metallization layer to leave behind the material that makes up the electrode.

19. The method of claim 1, wherein bonding the first substrate to the second substrate comprises: aligning the first substrate relative to the second substrate so that the electrode on the second substrate is in a position to control deflection of an associated micro mirror in the first substrate; and bonding the first substrate and the second substrate using a low temperature bonding method.

20. The method of claim 1, wherein forming a hinge and a mirror plate on the first substrate comprises: thinning a top layer of the first substrate to a pre-determined thickness; etching the hinge on the first substrate substantially beneath an upper surface of the thinned first substrate; depositing a sacrificial layer onto the first substrate; planarizing the first substrate to remove the sacrificial layer from the upper surface, of the first substrate; releasing the mirror plate by etching the first substrate; and removing the sacrificial layer on and around the hinge so the mirror plate can rotate about an axis defined by the hinge.

21. The method of claim 20, wherein thinning a top layer of the first substrate to a pre-determined thickness comprises: removing a handling substrate in the first substrate by grinding and/or etching; and stripping away an insulating oxide layer in the first substrate.

22. The method of claim 20, wherein etching the hinge on the first substrate substantially beneath an upper surface of the thinned first substrate comprises: etching a recess in the upper surface of the first substrate; and etching the first substrate to release the hinge from the first substrate, keeping an end of the hinge connected to the first substrate.

23. The method of claim 20, wherein depositing a sacrificial layer onto the first substrate comprises: filling a gap on and around the hinge with the sacrificial layer; and depositing the sacrificial layer on the upper surface of the first substrate.

24. The method of claim 20, wherein planarizing the first substrate to remove the sacrificial layer comprises using an etch back step or a chemical mechanical processing process to remove the sacrificial layer.

25. The method of claim 20, wherein removing the sacrificial layer on and around the hinge comprises using a plasma etch process.

26. The method of claim 1, wherein applying a reflective surface on a mirror plate and above a portion of the hinge comprises: depositing aluminum on an upper surface of the first surface; and depositing aluminum above a portion of the hinge, wherein the aluminum has a thickness of 300 Å or less.

27. A method of fabricating a plurality of mirrors for a spatial light modulator, comprising: forming a cavity in a first side of a first substrate; thinning a top layer on a second side of the first substrate to a predetermined thickness; etching a hinge on the second side of the first substrate substantially beneath an upper surface of the thinned first substrate; depositing a sacrificial layer on the second side of the first substrate; planarizing the second side of the first substrate; depositing a reflective surface on the second side of the first substrate; releasing a mirror by etching; removing the sacrificial layer on and around the hinge so the mirror can rotate about an axis defined by the hinge.

28. The method of fabricating a plurality of mirrors for a spatial light modulator of claim 27, wherein the reflective surface substantially conceals the hinge.

29. The method of fabricating a plurality of mirrors for a spatial light modulator of claim 27, wherein the reflective surface is deposited on the upper surface of the first substrate and above a portion of the hinge, the reflective surface having an area greater than an area of the upper surface of the mirror plate.

30. The method of claim 27, wherein forming a cavity in a first side of a first substrate comprises: generating a mask defining an area to be etched from the first side of the first substrate; removing material in the area on the first side of the first substrate defined by the mask, to form the cavity in the first side of the first substrate.

31. The method of claim 27, wherein forming a cavity in a first side of a first substrate comprises: obtaining the first substrate having a device layer of pre-determined thickness; depositing a dielectric material on the device layer of the first substrate; etching the dielectric material to create an opening at a location of a support wall of a spacer support frame to be created; growing in the opening a material having the same crystal structure as the device layer; and removing the dielectric layer.

32. The method of claim 31, wherein the first substrate further has an insulating oxide layer on the device layer and a handling substrate on the insulating oxide layer, and wherein the device layer has a thickness of between about 2 microns and about 3 microns.

33. The method of claim 30, wherein removing material in the area of the first substrate defined by the mask comprises etching the first substrate.

34. The method of claim 30, wherein removing material in the area of the first substrate defined by the mask comprises performing an anisotropic reactive ion etch with $SF_6$, HBr, and oxygen gases flowing.

35. The method of claim 27, wherein thinning a top layer of the second side of the first substrate comprises: removing the handling substrate by grinding and/or etching; and stripping the oxide layer.

36. The method of claim 27, wherein thinning a top layer of the second side of the first substrate comprises a process selected from the group consisting of grinding, silicon back etching, wet etching, and plasma etching.

37. The method of claim 27 wherein etching a hinge includes a first etch into the upper surface on the second side of the first substrate to form a recess below the upper surface, and a second etch to release the hinge from a mirror plate portion of the first substrate.

38. The method of claim 27 further comprising etching a motion stop on a lower surface of the mirror plate in the first substrate.

39. A method of fabricating a spatial light modulator including an array of a plurality of mirrors, comprising: generating a mask defining areas to be etched from a first side of a first substrate; etching the areas on the first side of the first substrate defined by the mask to form a plurality of cavities in the first side of the first substrate; fabricating electrodes on a first side of a second substrate; bonding the first side of the first substrate to the first side of the second substrate; thinning a top layer on the second side of the first substrate to a predetermined thickness; etching a hinge in the first substrate; depositing a sacrificial layer on the first substrate; planarizing the first substrate to remove the sacrificial layer from an upper surface on the second side of the first substrate, leaving sacrificial material on and around the hinge; depositing a reflective surface on the upper surface and above a portion of the hinge; releasing a mirror by etching; removing the remaining sacrificial layer from the first substrate so the mirror can rotate about an axis defined by the hinge.

40. The method of fabricating a spatial light modulator of claim 39, wherein the reflective surface having an area greater than an area of the upper surface of the mirror plate.

41. The method of fabricating a spatial light modulator of claim 39, wherein the reflective surface substantially conceals the hinge.

42. The method of fabricating a spatial light modulator of claim 39, wherein the hinge is formed substantially beneath an upper surface of the first, substrate and is substantially concealed by the reflective surface.

43. The method of claim 39, wherein etching the areas on the first side of the first substrate defined by the mask to form a plurality of cavities in the first side of the first substrate comprises performing an anisotropic reactive ion etch with $SF_6$, HBr, and oxygen gases flowing.

44. The method of claim 39, further comprising, prior to fabricating electrodes on the first side of the second substrate, forming control circuitry on the first side of the second substrate.

45. The method of claim 44, wherein forming control circuitry on the first side of the second substrate comprises fabricating a memory buffer, a display controller and a pulse width modulation array.

46. The method of claim 39, wherein fabricating electrodes on the first side of the second substrate comprises: covering the fabricated control circuitry with a passivation layer; depositing a metallization layer on the passivation layer; patterning the metallization layer in a pattern that will define the electrodes; and etching the metallization layer to leave behind the material that makes up the electrodes.

47. The method of claim 39 further comprising, prior to bonding the first side of the first substrate to the first side of the second substrate, aligning the first substrate with the second substrate so that the electrodes on the second substrate are positioned to control the deflection of mirrors in the first substrate when the first and second substrates are bonded together.

48. The method of claim 47, wherein aligning the first substrate with the second substrate comprises aligning a pattern on the first substrate with a pattern on the second substrate.

49. The method of claim 39, wherein bonding the first side of the first substrate to the first side of the second substrate comprises using a low temperature bonding method performed at less than approximately 400 degrees Celsius.

50. The method of claim 39 wherein etching the hinge includes a first etch into the upper surface of the first substrate to form a recess below the upper surface, and a second etch to release the hinge from a mirror plate portion of the first substrate.

51. The method of claim 39 further comprising etching a motion stop on a lower surface of the mirror and wherein the reflective surface is deposited on the upper surface of the first substrate and above a portion of the hinge.

* * * * *